United States Patent
Balasubramanian et al.

(10) Patent No.: US 12,063,514 B2
(45) Date of Patent: Aug. 13, 2024

(54) METHODS FOR RECONFIGURABLE INTELLIGENT SURFACE (RIS) AIDED COOPERATIVE DIRECTIONAL SECURITY

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Sourjya Dutta, San Diego, CA (US); Junyi Li, Fairless Hills, PA (US); Navid Abedini, Basking Ridge, NJ (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/648,087

(22) Filed: Jan. 14, 2022

(65) Prior Publication Data
US 2023/0232239 A1    Jul. 20, 2023

(51) Int. Cl.
H04W 12/65    (2021.01)
H04W 12/71    (2021.01)
H04W 72/23    (2023.01)
H04W 72/51    (2023.01)

(52) U.S. Cl.
CPC .......... *H04W 12/65* (2021.01); *H04W 12/71* (2021.01); *H04W 72/23* (2023.01); *H04W 72/51* (2023.01)

(58) Field of Classification Search
CPC ..... H04W 12/65; H04W 12/71; H04W 72/51; H04W 72/23
See application file for complete search history.

(56) References Cited

U.S. PATENT DOCUMENTS

| | | | |
|---|---|---|---|
| 10,162,594 B2 * | 12/2018 | Taki | G10L 15/22 |
| 11,689,407 B2 * | 6/2023 | Lee | H04W 72/23 370/329 |
| 11,715,451 B2 * | 8/2023 | Xiao | G10K 11/17857 381/71.6 |
| 2020/0252883 A1 * | 8/2020 | Tsuda | H04W 72/27 |
| 2021/0168655 A1 * | 6/2021 | Jung | H04W 28/0933 |
| 2021/0368437 A1 * | 11/2021 | Kim | H04W 52/0212 |
| 2022/0167166 A1 * | 5/2022 | Je | H04W 12/033 |

* cited by examiner

*Primary Examiner* — Hosuk Song
(74) *Attorney, Agent, or Firm* — The Marbury Law Group

(57) ABSTRACT

In various embodiments supporting directional security, a user equipment (UE) may receive from a network device a noise resource allocation including an indication of a noise direction and a noise parameter, generate a noise signal based at least in part on the noise parameter, and transmit the noise signal in the noise direction while transmitting a communication transmission signal in a different direction from the noise direction. In various embodiments, a network device may determine a geographic zone of interest, select one or more reconfigurable intelligent surfaces (RISs) associated with the geographic zone of interest, selecting one or more noise transmitting UEs, control the one or more noise transmitting UEs to transmit at least one noise signal, and control the one or more RISs to steer the at least one noise signal into the geographic zone of interest.

24 Claims, 21 Drawing Sheets

METHODS FOR RECONFIGURABLE INTELLIGENT SURFACE (RIS) AIDED COOPERATIVE DIRECTIONAL SECURITY

BACKGROUND

Long Term Evolution (LTE), Fifth Generation (5G) New Radio (NR) and other communication technologies enable user equipments (UEs), such as wireless devices, to communication in manners that were not available just a few years ago. Today's communication networks are also more secure, resilient to multipath fading, allow for lower network traffic latencies, provide better communication efficiencies (e.g., in terms of bits per second per unit of bandwidth used, etc.). One application for such communication networks is the provisioning of a variety of security applications and services within the networks.

SUMMARY

Various aspects include methods and devices configured to perform the methods for securing communications. Various aspects include methods and devices configured to perform the methods for supporting directional security in a wireless network.

Various aspects include methods performed by a processor of a user equipment (UE) for supporting directional security in a wireless network including receiving from a network device (e.g., a base station) a noise resource allocation including an indication of a noise direction and a noise parameter, generating a noise signal based at least in part on the noise parameter, and transmitting the noise signal in the noise direction while transmitting a communication transmission signal in a different direction from the noise direction.

Some aspects may further include receiving from the network device a communication resource allocation for the communication transmission signal including an indication of the different direction.

In some aspects, the communication resource allocation may include an indication of a first power level for the communication transmission signal, the noise resource allocation may include an indication of a second power level, and transmitting the noise signal in the noise direction while transmitting the communication transmission signal in the different direction from the noise direction may include transmitting the noise signal in the noise direction at the second power level while transmitting the communication transmission signal at the first power level in the different direction from the noise direction.

In some aspects, the second power level may be less than a value of a power headroom below a maximum transmission power of the UE.

Some aspects may further include, prior to receiving the noise resource allocation, determining whether cooperative directional security is supported, and sending a message including an indication of support for cooperative directional security to the network device in response to determining that cooperative directional security is supported.

Some aspects may further include sending, to the network device, an indication of an index of a codebook used for transmitting the communication transmission signal in response to determining that cooperative directional security is supported.

Some aspects may further include sending an indication to the network device of a change in position of an intended receiver of the communication transmission signal, receiving from the network device a resource allocation update including an indication of a new direction for the communication transmission signal and a new direction for the noise signal, such that the new direction for the communication transmission signal is different than the new direction for the noise signal and is the same or different than the noise direction, and transmitting the noise signal in the new direction for the noise signal while transmitting the communication transmission signal in the new direction for the communication transmission signal.

Further aspects include a UE having a processor configured to perform one or more operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

Various aspects include methods performed by a processor of a network device for supporting directional security in a wireless network including determining a geographic zone of interest, selecting one or more reconfigurable intelligent surfaces (RISs) associated with the geographic zone of interest, selecting one or more noise transmitting User Equipments (UEs), controlling the one or more noise transmitting UEs to transmit at least one noise signal, and controlling the one or more RISs to steer the at least one noise signal into the geographic zone of interest.

In some aspects, controlling the one or more noise transmitting UEs to transmit at least one noise signal may include, for each noise transmitting UE, determining a noise direction from the noise transmitting UE to a RIS among the one or more RISs, determining a noise parameter for the noise transmitting UE, and sending a noise resource allocation including an indication of the noise direction and the noise parameter to the noise transmitting UE, and controlling the one or more RISs to steer the at least one noise signal into the geographic zone of interest includes, for each respective one of the one or more RISs, determining one or more steering parameters for the RIS to use to steer one or more noise signals along a steering direction from the RIS to the geographic zone of interest, and sending the one or more steering parameters to the RIS.

Some aspects may further include, for each respective one of the one or more noise transmitting UEs, sending a communication resource allocation for a communication transmission signal including an indication of a different direction from the noise direction.

Some aspects may further include determining, for each respective one of the one or more noise transmitting UEs, a noise power level that is less than a power level of a communication transmission signal, such that the noise resource allocation further includes an indication of the noise power level.

In some aspects, the one or more steering parameters may include beamforming weights.

In some aspects, the noise parameter may include an indication of a modulation coding scheme or a pseudorandom key.

Some aspects may further include receiving from a reporting one of the one or more noise transmitting UEs an indication of a change in position of an intended receiver of a communication transmission signal of that reporting noise transmitting UE, determining a new noise direction from that reporting noise transmitting UE to a RIS among the one or more RISs, sending a resource allocation update to the reporting noise transmitting UE including an indication of the new noise direction, and for at least one of the one or more RISs determining one or more updated steering parameters for the RIS to use to steer one or more noise signals along a steering direction from the RIS to the geographic zone of interest, and sending the one or more updated steering parameters to the RIS.

In some aspects, selecting one or more noise transmitting UEs may include selecting available UEs reporting support for cooperative directional security as cooperative UEs, determining positions of each of the cooperative UEs, selecting any of the cooperative UEs that are in a position relative to at least one of the one or more RISs to transmit a noise signal toward at least one of the one or more RISs as positioned cooperative UEs, determining at least one transmission metric for each of the positioned cooperative UEs, and selecting any of the positioned cooperative UEs having the at least one transmission metric meeting a noise transmission requirement as the one or more noise transmitting UEs.

In some aspects, the at least one transmission metric is a power headroom and the noise transmission requirement is a minimum power headroom.

Further aspects include a network device having a processor configured to perform one or more operations of any of the methods summarized above. Further aspects include processing devices for use in a network device configured with processor-executable instructions to perform operations of any of the methods summarized above. Further aspects include a non-transitory processor-readable storage medium having stored thereon processor-executable instructions configured to cause a processor of a network device to perform operations of any of the methods summarized above. Further aspects include a network device having means for performing functions of any of the methods summarized above. Further aspects include a system on chip for use in a network device and that includes a processor configured to perform one or more operations of any of the methods summarized above. Further aspects include a UE having a processor configured to perform one or more operations of any of the methods summarized above. In some aspects, the UE is a wireless communication device.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
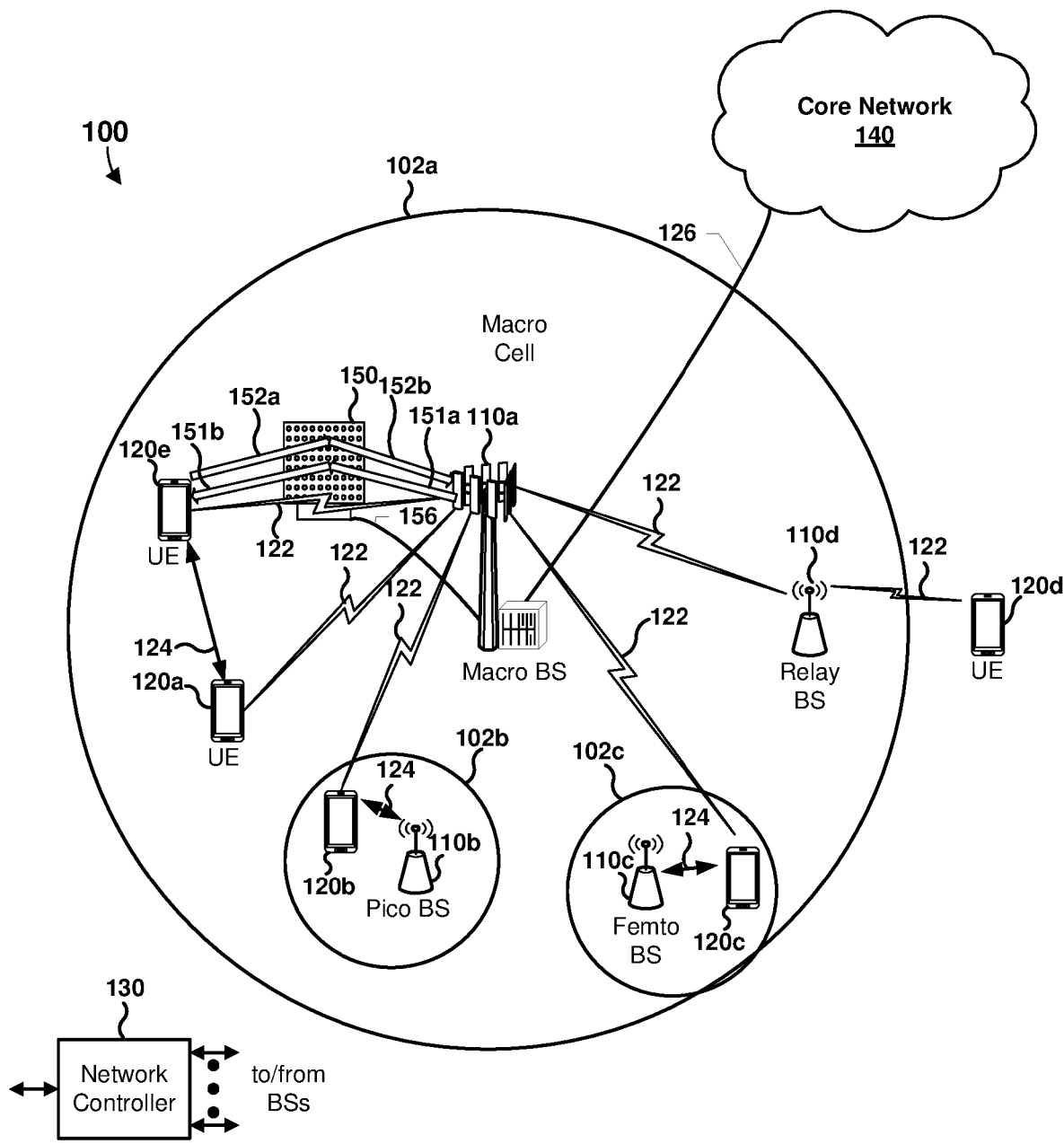
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments enable directional security in a wireless network. Various embodiments enable a network device, such as a network node or base station, to provide cooperative directional security by directing one or more wireless communication devices, such as user equipments (UEs), to generate one or more noise signals and one or more reconfigurable intelligent surfaces (RISs) to reflect the one or more noise signals into a geographic zone of interest. Reflecting the one or more noise signals into the geographic zone of interest may create radio frequency (RF) interference in the geographic zone of interest. The created RF interference may limit or prevent a UE in the geographic zone of interest from effectively receiving at least some RF communications. For example, the RF interference in the geographic zone of interest may prevent reception of RF communications on one or more channels. Limiting or preventing RF communications in the geographic zone of interest may improve directional security in a wireless network without limiting RF communications of UEs outside the geographic zone. Limiting or preventing RF communications in the geographic zone of interest may improve directional security in a wireless network by limiting or preventing wireless communication eavesdropping by a malicious UE in the geographic zone of interest.

The one or more RISs may be controlled to reflect multiple noise signals into the geographic zone of interest, thereby resulting in the total created RF interference being of greater power than the individual noise signals reflected by the one or more RISs. The control of the RIS to reflect multiple noise signals together into the geographic zone of interest may enable the power allocated to transmitting an individual noise signal by any one of the multiple UEs to be lower than a value of a power headroom below a maximum transmission power of that UE. The transmission of an individual noise signal with a power level lower than a value of a power headroom below a maximum transmission power of that UE may ensure the UE transmitting the individual noise signal meets that UE's Quality of Service (QoS) while transmitting the noise signal.

The terms "user equipment" and "UE" are used herein to refer to any one or all of endpoint or user devices, including wireless communication devices, wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, UEs affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks.

In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including Long Term Evolution (LTE) standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "reconfigurable intelligent surface" and "RIS" are used herein to refer to any one or all of devices that may include a reflecting surface configured to be controlled to steer (or otherwise change the direction of) a reflected radio frequency (RF) wave, such as a carrier and/or subcarrier wave of a wireless network (e.g., LTE networks, 5G networks, later generation networks, etc.), a UE transmitted RF signal, etc. Steering a reflected RF wave may be accomplished by changing or controlling the angle of reflection of a reflected RF wave, such that the angle of transmission of the reflected RF wave off the reflecting surface is different than the angle of incidence of the incident RF wave on the reflecting surface.

In some embodiments, a reflecting surface of a RIS may be an assembly of reflective antennas and controllable phase-shifting circuit elements in which the phase-shifting circuit elements can be controlled to shift the phase of an incident RF wave by a controlled phase shift amount so that a reflected (or retransmitted) RF wave emerges from the reflecting surface with an angle of reflection from the surface that is different from the angle of incidence of the incident RF wave. A reflecting surface of a RIS may be an assembly of reflective antennas and controllable phase-shifting circuit elements that is not connected to a transmitter, receiver, and/or transceiver and/or may be an assembly of reflective antennas and controllable phase-shifting circuit elements that does not provide electrical current resulting from an incident RF wave contacting the reflecting surface to and/or from a transmitter, receiver, and/or transceiver.

While a reflecting surface of a RIS may be controllable to result in a selected angle of reflection for a reflected RF wave, the reflecting surface of a RIS may be considered a passive surface in relation to RF communications purposes in that any electrical current generated in the reflecting surface of the RIS by an incident RF wave may not be used by the RIS for RF communications purposes. The reflecting surface of a RIS may act as a phased array antenna controlled to steer an incident RF wave in desired direction. A network device, such as a network node or base station, may control a RIS to steer an incident RF wave in a desired direction by providing analog beamforming weights to phase-shifting circuit elements of the RIS configured to reflect the RF wave in a desired direction.

A RIS may be controlled to change a channel environment in a wireless network. For example, rather than transmitting signals directly to a UE, a network device, such as a network node or base station, may control a RIS to reflect a transmitted signal from the network device toward the UE. In such an example, the channel path may change from between the UE and network device to from the network device to the RIS and from the RIS to the UE. As a RIS may be controllable by a network device to steer a RF waveform, a network device may artificially induce a desired channel response by selecting a number of RISs in an environment and adapting the analog beamforming weights of the RIS. As another example, a network device may control a RIS to reflect one of multiple beams of RF signals toward a UE while one or more other beams are steered directly toward the UE, thereby supporting Multiple Input Multiple Output (MIMO) communication techniques between the network device and the UE.

Various embodiments may enable directional security in a wireless network by inducing a desired channel response using a RIS that enables secure communication by legitimate UEs while confusing malicious eavesdropper UEs in a geographic zone of interest. Various embodiments may enable a UE to transmit a communication signal to an intended receiver UE while also transmitting a noise signal. Various embodiments may enable a RIS to be controlled to steer a reflected noise signal in a desired direction thereby changing channel conditions to provide security to a geographic zone of interest. Various embodiments may enable a network device, such as a network node or base station, to control one or more UEs and one or more RISs to provide cooperative directional physical layer (PHY) security (also sometimes referred to as cooperative zone based PHY security) in a wireless network.

A geographic zone of interest may be a geographic point (e.g., a point described by coordinates such as at least a latitude and a longitude), a geographic area (e.g., an area encompassed by a circle or other shape surrounding a geographic point), or other type geographic space into which one or more noise signals are to be transmitted. The transmission of noise signals into the geographic zone of interest may increase interference in the channel environment as experienced by a receiver at or within the geographic zone of interest in comparison to a UE outside the geographic zone of interest. At a high enough level of interference, the noise signals transmitted into the geographic zone of interest may effectively jam an eavesdropping receiver at or within the geographic zone of interest.

In various embodiments, a network device (e.g., a base station or other network node) may select one or more UEs to participate in cooperative directional security operations. For example, the network device (e.g., a base station or other network node) may select those UEs that signal a capability to support cooperative directional security. As an example, UEs may be pre-configured to support cooperative directional security and may pre-signal a capability to participate using a message, such as a media access control (MAC)-control element (CE) (MAC-CE) message, a radio resource control (RRC) message, etc., sent to a network device, such as a base station or other network node. For example, the message sent by the UE may include a one-bit indication of a willingness or capability of the UE to participate in cooperative directional security.

As another example, the network device (e.g., a base station) may select UEs that may be capable of satisfying Quality of Service (QoS) requirements for communication with an intended receiver of a communication signal in a first direction while also transmitting an additional signal, such as a noise signal, in a second direction. As examples, QoS requirements may include minimum block error rates, minimum buffer statuses, etc. Satisfaction of QoS requirements may be determined by monitoring QoS reports received from UEs, such as block error reports, buffer status reports, etc.

As another example, the network device (e.g., a base station or other network node) may select UEs that may be capable of satisfying QoS requirements for communication with an intended receiver of a communication signal in a first direction while also transmitting an additional signal, such as a noise signal, in a second direction with insignificant overhead impact on the communication signal (e.g., the power leakage in the first direction due to the transmission of the additional signal in the second direction is below a threshold power leakage, etc.).

As another example, the network device (e.g., a base station or other network node) may select UEs based on power head room (PHR) reports by UEs. The network device (e.g., a base station or other network node) may select UEs that have a power head room at or above a minimum power head room based on the PHR reports by the UEs. The network device (e.g., a base station or other network node) may select UEs that have a power head room at or above a threshold reported based on the PHR reports by the UEs in a number, such as one or more, previous slots.

In various embodiments, each UE participating in cooperative directional security may transmit the UE's intended communication signal along a first direction. The first direction may be the direction from the UE to the intended receiver of the communication. As examples, the intended communication signal may be an uplink or sidelink transmission signal. While transmitting that UE's respective intended communication signal, each UE participating in cooperative directional security may also transmit a noise signal in a second direction using beam forming techniques. The noise signal may be an additional signal not used for communication, such as an artificial noise signal or other non-information carrying signal. The second direction may be a direction different than the first direction, such as a direction orthogonal to the first direction, a direction outside of a main lobe of the UE's intended communication signal, etc. In some embodiments, the power level of the noise signal may be low, such as less than the power level of communication signal in the first direction. In some embodiments, the power level of the noise signal may be selected such that the transmission of the noise signal has insignificant overhead impact on the communication signal. For example, the power leakage in the first direction due to the transmission of the noise signal in the second direction may be below a threshold power leakage.

In various embodiments, the additional signals, such as noise signals, transmitted by multiple UEs participating in cooperative directional security, may be reflected and steered by a RIS to beamform the additional signals into a geographic zone of interest. The steering by a RIS to beamform the additional signals into a geographic zone of interest may increase, such as maximize, the interference created in the geographic zone of interest. While the power allocated for each individual additional signal, e.g., each individual noise signal, may be low (e.g., the power leakage in the first direction due to the transmission of the additional signal in the second direction is below a threshold power leakage, etc.), the steering by the RIS of all additional signals emitted by multiple UEs at the same time (e.g., noise signals of all participating UEs) into the geographic zone of interest may result in a higher level of interference in the geographic zone of interest than achievable by the additional (e.g., noise) signal of any individual UE.

In various embodiments, a network device (e.g., a base station or other network node) may select a subset of available UEs to participate in cooperative directional security to transmit a first signal and a second signal in a first direction and a second direction, respectively. As an example, the available UEs may be those UEs that have been provided uplink grants by the network device, such as a base station or other network node. As another example, the available UEs may be those UEs performing sidelink communications that have previously registered with the network device, such as a base station or other network node. UEs not selected to participate in cooperative direction security may be provided uplink grants to transmit in only a single direction.

In some embodiments, UEs selected to participate in cooperative directional security may transmit a communication signal in a first direction toward an intended receiver device and a noise signal in a second direction toward a RIS. In some embodiments, a network device, such as a base station or other network node, may determine the position of the UEs selected to participate in cooperative directional security and may determine the position of the intended receiver devices of the communication signals from the selected UEs. From the two positions (i.e., the transmitting selected UE position and the position of the intended receiver device), the network device (e.g., a base station or other network node) may determine the first transmission direction. In some embodiments, the second direction for UE transmissions may be a direction different than the first direction, such as a direction orthogonal to the first direction, a direction almost orthogonal to the first direction, a direction outside a main lobe of a communication signal transmitted in the first direction, etc.

In various embodiments, a network device (e.g., a base station or other network node) may send a noise resource allocation to UEs selected to participate in cooperative directional security. The noise resource allocation may include an indication of a noise direction, a noise parameter, and/or a noise power level.

As an example, through downlink control information (DCI), a network device (e.g., a base station or other network node) may provide a UE selected to participate in cooperative directional security, a first direction index from a first codebook and a second direction index from a second codebook. A codebook may be a data structure, such as a matrix, etc., that may identify parameters of one or more beam patterns and/or beam directions, such as beamforming vectors, direction indexes, etc. The first direction index may be associated with a direction of an intended receiver device of a communication signal. The second direction index may be associated with a direction of a RIS in which a noise signal is to be transmitted.

Through DCI, a network device (e.g., a base station or other network node) may provide a UE selected to participate in cooperative directional security a first power allocation for transmitting a communication signal along the first direction to an intended receiver device and a second power allocation for transmitting a noise signal along the second direction to a RIS. Additionally, through DCI, a network device (e.g., a base station or other network node) may provide a UE selected to participate in cooperative directional security one or more noise parameters, such as a modulation coding scheme (MCS) or a pseudorandom key for use in generating a noise signal.

As another example, a noise parameter may include a slot-offset. The slot-offset may indicate after how many slots from receiving the DCI including the noise parameter the UE is to transmit the communication signal in the first direction and the noise signal in the second direction. The communications signal in the first direction and the noise signal in the second direction may be sent in the same slot.

In some embodiments, a UE selected to participate in cooperative directional security may be communicating in a sidelink to an intended receiver. The UE selected to participate in cooperative directional security may provide to a network device (e.g., a base station or other network node) an index of the codebook that the UE is using for the intended direction to the receiver device in the sidelink. The UE selected to participate in cooperative directional security may provide to a network device (e.g., a base station or other network node) a location of the intended receiver device for the sidelink communications.

In some embodiments, a UE selected to participate in cooperative directional security may determine whether a location of an intended receiver has changed more than a threshold and/or whether the intended receiver has changed. In response to determining that a location of an intended receiver has changed more than a threshold and/or the intended receiver has changed, the UE selected to participate in cooperative directional security may trigger a report to the network device, such as a base station or other network node. The report may include a new or updated location of the intended receiver. Based on the new or updated location of the intended receiver, the network device (e.g., a base station or other network node) may update a noise direction, a noise power level, and/or a noise parameter for the UE selected to participate in cooperative directional security and provide the updated noise direction, noise power level, and/or noise parameters to the UE. Additionally, the network device (e.g., a base station or other network node) may update the beamforming weights for the RIS to steer the beam toward the geographic zone of interest.

In some embodiments, a UE selected to participate in cooperative directional security may periodically report directions to, or positions of, intended receivers of communications signals to a network device, such as a base station or other network node. For example, the UE may report the directions to, or positions of, intended receivers of communications signals every one or more slots. The number of slots between reporting may be configured by the network device, such as a base station or other network node.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1). The communications system 100 also may include a number of network devices 110a, 110b, 110c, 110d and other network entities, such as. A network node, such as a base station, is an entity that communicates with UEs, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. In various communication network implementations or architectures, a network node may be implemented as an aggregated base station, as a disaggregated base station, an integrated access and backhaul (IAB) node, a relay node, a sidelink node, etc. Also, in various communication network implementations or architectures, a network device (or network entity) may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. Each network node, RU or base station, may provide communication coverage for a particular geographic area. In 3GPP, the term "cell" can refer to a coverage area of a base station, an RU, a network node or a base station subsystem serving this coverage area, or a combination thereof, depending on the context in which the term is used. The core network 140 may be any type core network, such as an LTE core network (e.g., an Evolved Packet Core (EPC) network), 5G core network, etc.

The communications system 100 may also include one or more RISs (illustrated as RIS 150). A RIS may be an entity controlled by a network device, such as a network node or base station 110a, to steer (or otherwise change) an incident RF wave, such as a carrier and/or subcarrier wave, a UE transmitted RF signal, etc., such that an angle of reflection of a reflected RF wave resulting from reflecting the incident RF wave off a reflecting surface is different than an angle of incidence of the incident RF wave on the reflecting surface.

A network device, such as a network node or base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with a service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A network device, such as a network node or base station for a macro cell may be referred to as a macro BS. A base station for a pico cell may be referred to as a pico BS. A network device, such as a network node or base station for a femto cell may be referred to as a femto network device or a home network device. In the example illustrated in FIG. 1, a network device, such as a network node or base station 110a may support a macro cell (e.g., network device 102a), a pico cell (e.g., network device 102b, and a base station 110c may be a femto network device for a femto cell 102c. A network device, such as a network node or base station 110a-110d may support one or multiple (for example, three) cells. The terms "network node," "RU," "eNB", "base station", "NR BS", "gNB", "TRP", "AP", "node B", "5G NB", and "cell" may be used interchangeably herein. A network device 110a-110d may control one or more RIS 150 in a cell.

In some examples, a cell may not be stationary, and the geographic area of the cell may move according to the location of a network device, such as a network node or mobile base station. In some examples, the network devices 110a-110d may be interconnected to one another as well as to one or more other network devices (e.g., base stations or network nodes (not illustrated)) and/or one or more RIS 150 in the communications system 100 through various types of backhaul interfaces, such as a direct physical connection, a virtual network, or a combination thereof using any suitable transport network.

The network devices 110a-110d may communicate with the core network 140 over a wired or wireless communication link 126. The UEs 120a-120e may communicate with the network devices 110a-110d over a wireless communication link 122. Additionally, the network devices 110a-110d may communicate with the RIS 150 over a wired or wireless communication link 156.

The wired communication links 126, 156 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay network device 110d). A relay station is an entity that can receive a transmission of data from an upstream station (for example, a network device or a UE) and send a transmission of the data to a downstream station (for example, a UE or a network device). A relay station also may be a wireless device (e.g., a UE) that can relay transmissions for other UEs. In the example illustrated in FIG. 1, a relay station 110d may communicate with a macro network device 110a and the UE 120d in order to facilitate communication between the network device 110a and the UE 120d. A relay station also may be referred to as a relay network device, a relay base station, a relay, etc.

The communications system 100 may be a heterogeneous network that includes network devices of different types, for example, macro network devices, pico network devices, femto network devices, relay network devices, etc. These different types of network devices may have different transmit power levels, different coverage areas, and different impacts on interference in communications system 100. For example, macro network devices may have a high transmit power level (for example, 5 to 40 Watts) whereas pico network devices, femto network devices, and relay network devices may have lower transmit power levels (for example, 0.1 to 2 Watts).

A network controller 130 may couple to a set of network devices and may provide coordination and control for these network devices. The network controller 130 may communicate with the network devices via a backhaul. The network devices also may communicate with one another, for example, directly or indirectly via a wireless or wireline backhaul.

The UEs 120a, 120b, 120c may be dispersed throughout the communications system 100, and each UE may be stationary or mobile. A UE also may be referred to as an access terminal, a terminal, a mobile station, a subscriber unit, a station, wireless device, etc.

A macro network device 110a may communicate with the communication network 140 over a wired or wireless communication link 126. The UEs 120a, 120b, 120c may communicate with a network device 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a subcarrier bandwidth of 75 kHz over a 0.1 millisecond (ms) duration. Each radio frame may be made up of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a network device, another device (for example, remote device), or some other entity.

A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more UEs (for example, illustrated as the UE 120a and the UE 120e) may communicate directly using one or more sidelink channels (for example, without using a network device 110a-d as an intermediary to communicate with one another). For example, the UEs 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the network device 110a-110d.

In some implementations, a UE and a network device (for example, illustrated as the UE 120e and the network device 110a) may communicate via reflections off a RIS, such as RIS 150. For example, the network device 110a may transmit a communication signal 151a (e.g., in the downlink path) in the direction of the RIS 150 and the RIS 150 may reflect the communication signal as a reflected communication signal 151b to the UE 120e. Similarly, the UE 120e may transmit a communication signal to 152a (e.g., in the uplink path) in the direction of the RIS 150 and the RIS 150 may reflect the communication signal as a reflected communication signal 152b to the network device 110a. In some cases, the UE 120e and network device 110a may establish a wireless communication link 122 with one another via the transmitted signals 151a and 152a and the reflected signals 151b and 152b.

Figure 2:
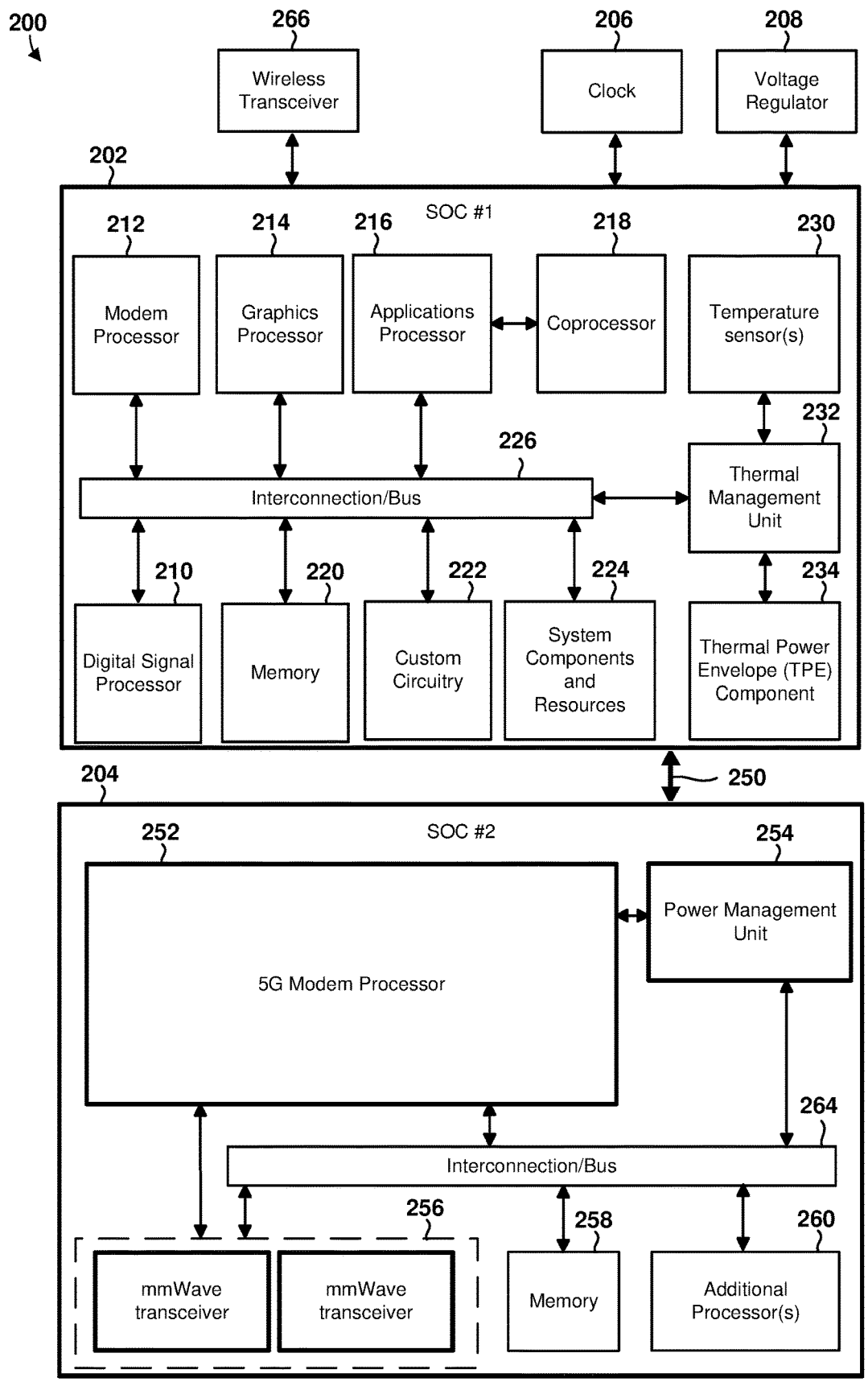
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1-2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from other devices, such as UEs (e.g., UE 120a-120e), network devices (e.g., network devices 110a-110d), etc. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD®, LINUX®, OS X™, etc.) and a processor that executes a second type of operating system (such as MICROSOFT WINDOWS® 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
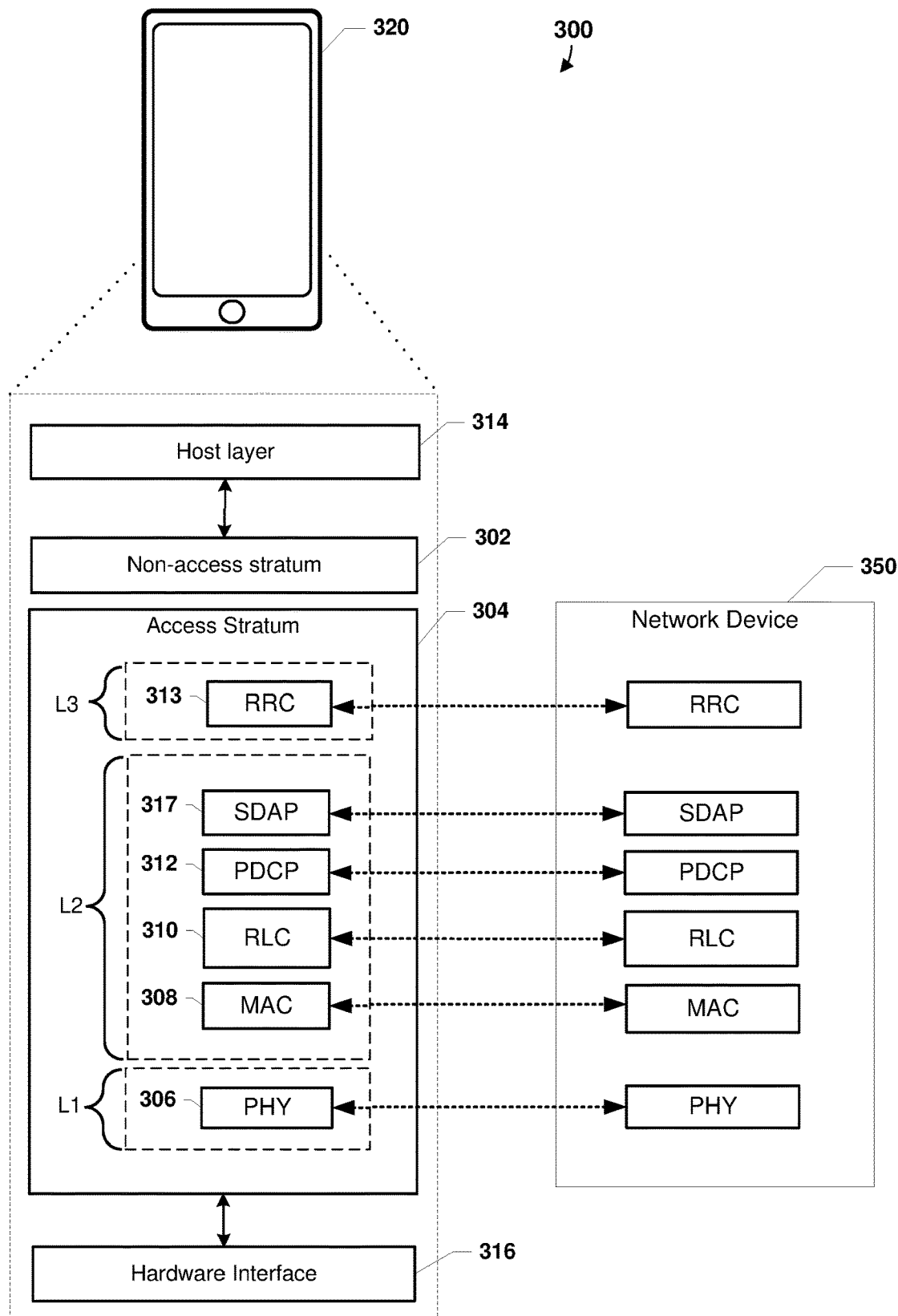
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the UE 320 may implement the software architecture 300 to facilitate communication between a UE 320 (e.g., the UE 120a-120e, 200) and a network device 350 (e.g., network device 110a-110d) of a communication system (e.g., 100). In various embodiments, layers in software architecture 300 may form logical connections with corresponding layers in software of the network device 350. The software architecture 300 may be distributed among one or more processors (e.g., the processors 212, 214, 216, 218, 252, 260).

While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a network device, network node, RU, base station, etc.). In particular, the AS 304 may include at least three layers (Layer 1, Layer 2, and Layer 3), each of which may contain various sublayers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network device 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer each of which form logical connections terminating at the network device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network device 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW).

In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

In various network implementations or architectures, the different logical layers 308-317 may be implemented in an aggregated or monolithic base station architecture, or alternatively, in a disaggregated network device architecture, and various logical layers may implemented in one or more of a CU, a DU, an RU, a Near-RT RAN Intelligent Controller (RIC), or a Non-Real Time (Non-RT) RIC. Further, the network device 350 may be implemented as an aggregated base station, as a disaggregated base station, an integrated access and backhaul (IAB) node, a relay node, a sidelink node, etc.

Figure 4A:
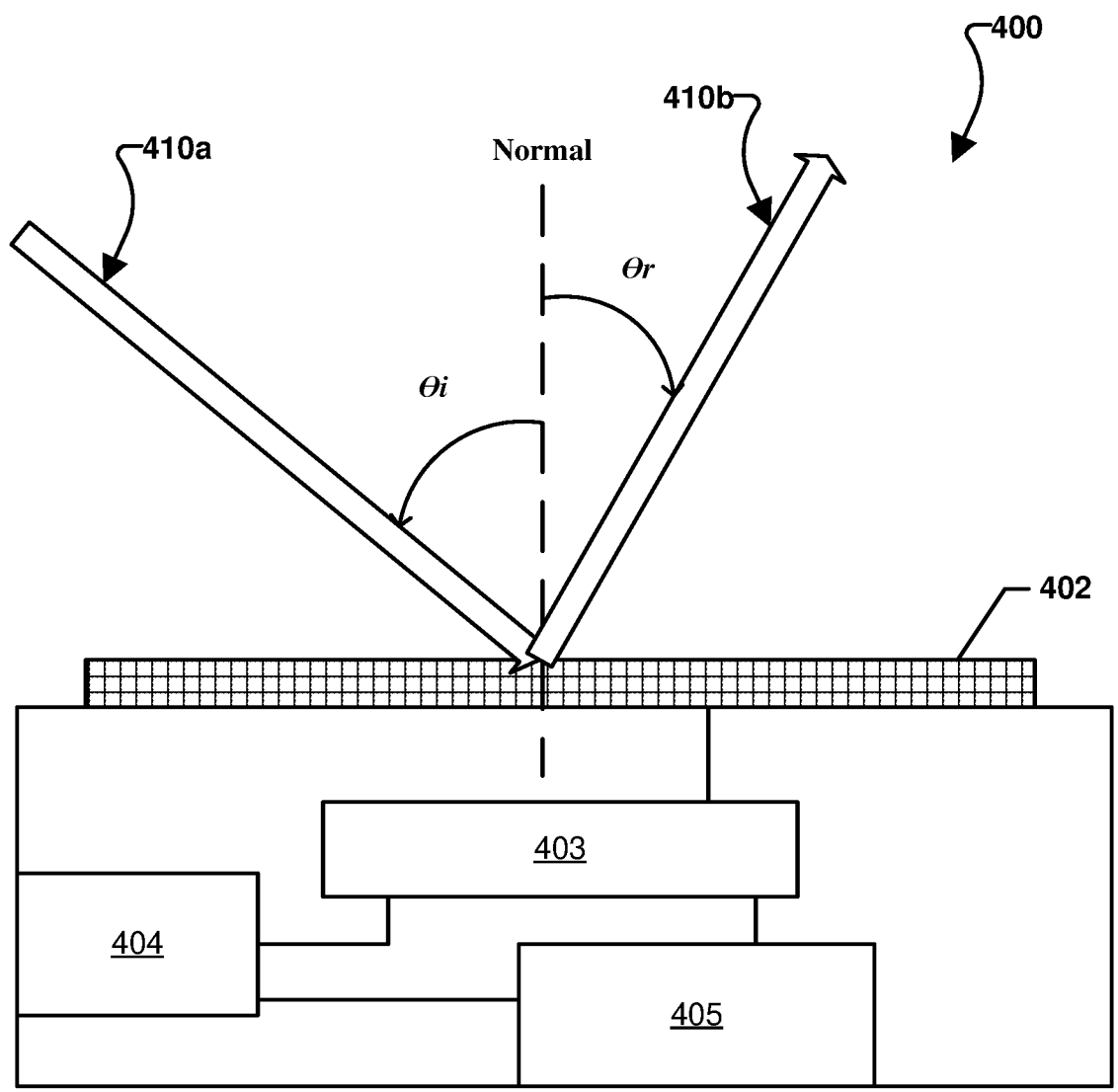
FIG. 4A is a block diagram of a reconfigurable intelligent surface (RIS) suitable for use with various embodiments.

FIG. 4A is a block diagram of an example of a RIS 400 suitable for implementing any of the various embodiments. With reference to FIGS. 1-4A, the RIS 400 (e.g., RIS 150) may include a reflective surface 402, such as an array of antenna elements, connected to a controller, such as a processor 403. The processor 403 may be connected to a power source 404, such as a battery, power connection to a power grid, connection to a solar panel, etc. The processor 403 may be coupled to a network access port 405 (or interface) for establishing data connections with a network, such as the Internet or a local area network, or coupled to other network devices 110a-110d, 350, such as a base station or other network node.

The processor 403 may receive messages and/or instructions from a network device 110a-110d, 350, such as a base station or other network node via the network access port 405. The received messages and/or instructions may include indications of steering parameters, such as analog beamforming weights, indications of selected angles of reflection, selected directions, etc.

Figure 4B:
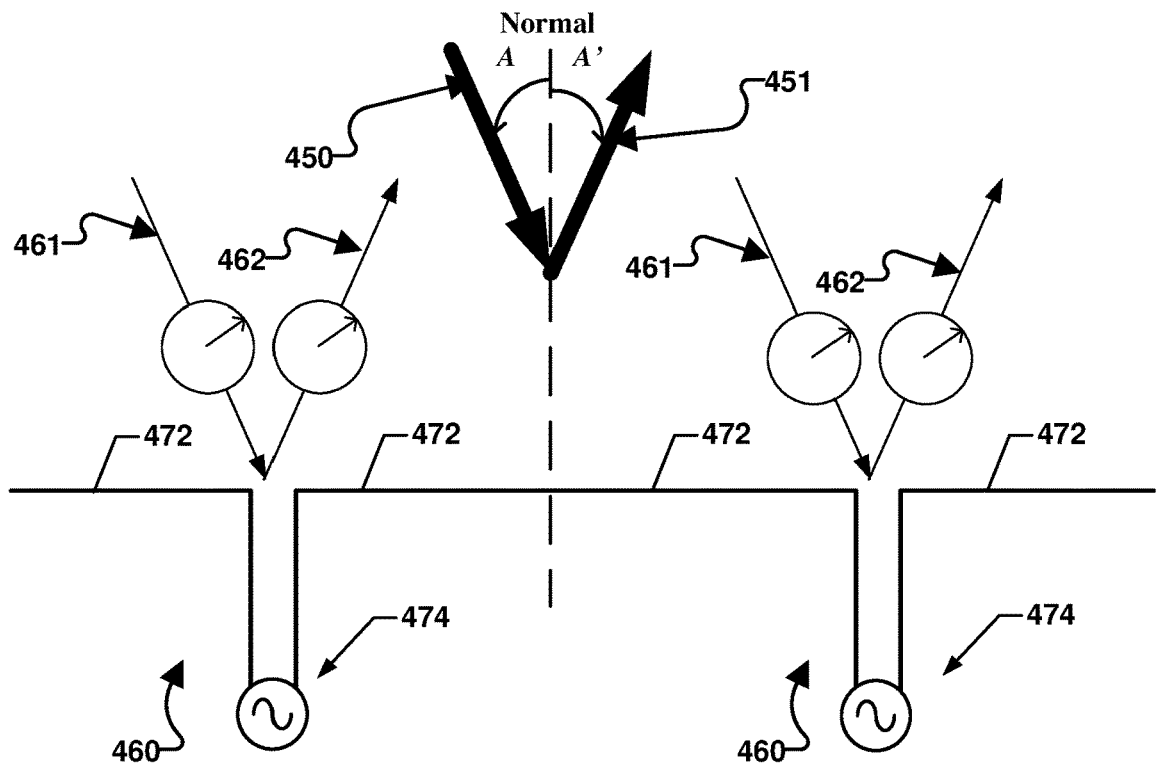
FIG. 4B illustrates aspects of an incident radio frequency (RF) wave reflected from a portion of a RIS without a change in RF phase consistent with various embodiments.
Figure 4C:
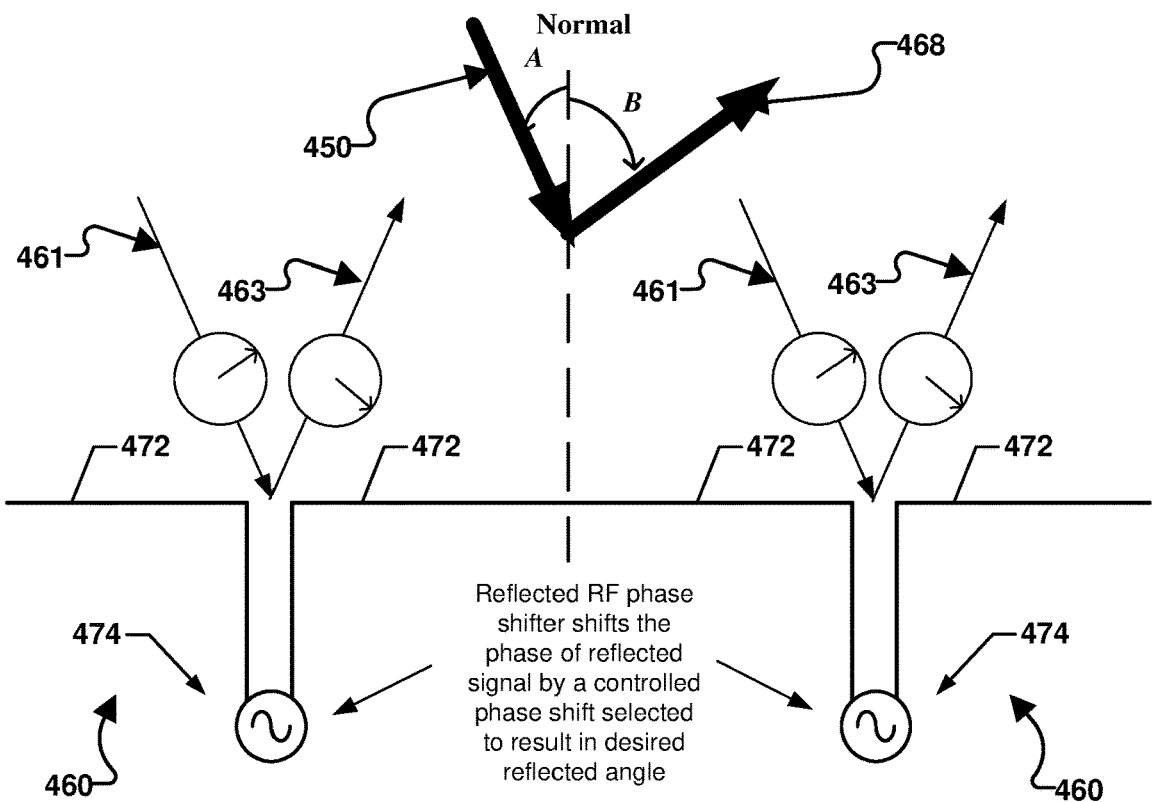
FIG. 4C illustrates aspects of an incident RF wave reflected from a portion of a RIS with a change in RF phase applied to steer a reflected RF wave consistent with various embodiments.

The reflective surface 402 may include one or more antenna and controllable phase-shifting circuit elements as illustrated in FIGS. 4B and 4C. The one or more antenna and controllable phase-shifting circuit elements may be organized into one or more arrays of elements. The individual antenna and controllable phase-shifting circuit elements and/or groups of elements within an array may be controllable to change a phase of a RF wave (or RF signal) incident on the reflective surface 402 such that that the angle of reflection (θr) of a reflected RF wave 410b resulting from reflecting an incident RF wave 410a off the reflecting surface 402 is different than the angle of incidence (θi) of the incident RF wave 410a on the reflecting surface.

The processor 403 may provide current and/or voltages and/or control signals to the phase-shifting circuit elements of the reflective surface 402 to control the phase shift imparted by a phase shift controller of the one or more antenna and controllable phase-shifting circuit elements. Antenna and controllable phase-shifting circuit elements and/or arrays of antenna and controllable phase-shifting circuit elements of the reflecting surface 402 may be individually controlled by the processor 403. Controlling different antenna and controllable phase-shifting circuit elements and/or different arrays of antenna and controllable phase-shifting circuit elements differently may enable the reflecting surface 402 to operate as different panels of a phase array antenna.

While only a single reflective surface 402 is illustrated in FIG. 4A, a RIS may include more than one reflective surface 402. As illustrated in FIG. 4A, the reflecting surface 402 may not be connected to a transmitter, receiver, and/or transceiver and/or may be a surface of antenna and controllable phase-shifting circuit elements that does not provide electrical current resulting from an incident RF wave 410a contacting the reflecting surface 402 to and/or from a transmitter, receiver, and/or transceiver. While phase-shifting circuit elements of the reflecting surface 402 may be controllable to result in a selected angle of reflection (θr) for a reflected RF wave 410b, the reflecting surface 402 may be considered a passive reflective surface for RF communications purposes in that any electrical current generated in the reflecting surface 402 by an incident RF wave 410a may not be used by the RIS 400 for RF communications purposes.

FIGS. 4B and 4C illustrate aspects of an incident RF wave 450 reflected from a portion of a RIS reflecting surface 402 including two elements 460 each including an antenna portion 472 and a phase-shifter circuit element 474. With reference to FIGS. 1-4C, the illustrated portion of the RIS (e.g., RIS 150, 400) in FIG. 4B shows reflection of the incident RF wave 450 without a change in RF phase, and the illustrated portion of the RIS in FIG. 4C shows reflection of the incident RF wave 450 with a change in RF phase applied to steer a reflected RF wave 468. The phase of the incident RF wave 450 is illustrated by phase direction 461. The angle of incidence of the RF wave 450 is measured from the normal of the reflective surface and is represented by the angle A. As no change in RF phase is applied in FIG. 4B, the incident RF wave 450 is reflected as reflected wave 451 having an angle of reflection A' that is the same as the angle of incidence A. The phase of the reflected RF wave 451 is illustrated by the phase direction 462. The phase directions 461 and 462 are the same as no phase shift is applied in the example illustrated in FIG. 4B.

In the example illustrated in FIG. 4C, a phase shift is applied by the phase-shifting circuit elements 474 to steer the reflected RF wave 468. Specifically, the phase-shifter circuit element 474 of each element 460 may apply a phase shift that changes the direction of the reflected RF wave 468 to a phase direction 463. Thus, the phase-shifter circuit elements 474 induce a phase shift in the reflected RF wave 468 that causes the phase direction 463 to be different than the phase direction 461.

The shift in phase direction steers the reflected RF wave 468 such that the reflected RF wave 468 has an angle of reflection B that is different than the angle of incidence A. The amount of phase shift applied by the phase-shifting circuit element 474 in each element 460 may be controlled by a processor (e.g., processor 403) controlling the phase-shifting circuit elements 474 in each element 460 to steer the reflected RF wave 468 in a selected direction. The steering of the reflected RF wave 468 may be controlled by a processor (e.g., processor 403) controlling the phase-shifting circuit element 474 in each element 460 according to steering parameters, such as analog beamforming weights, indications of selected angles of reflection, selected directions, etc., provided to the RIS (e.g., RIS 150, 400) by a network 110a-110d, 350, such as a base station or other network node.

Figure 5:
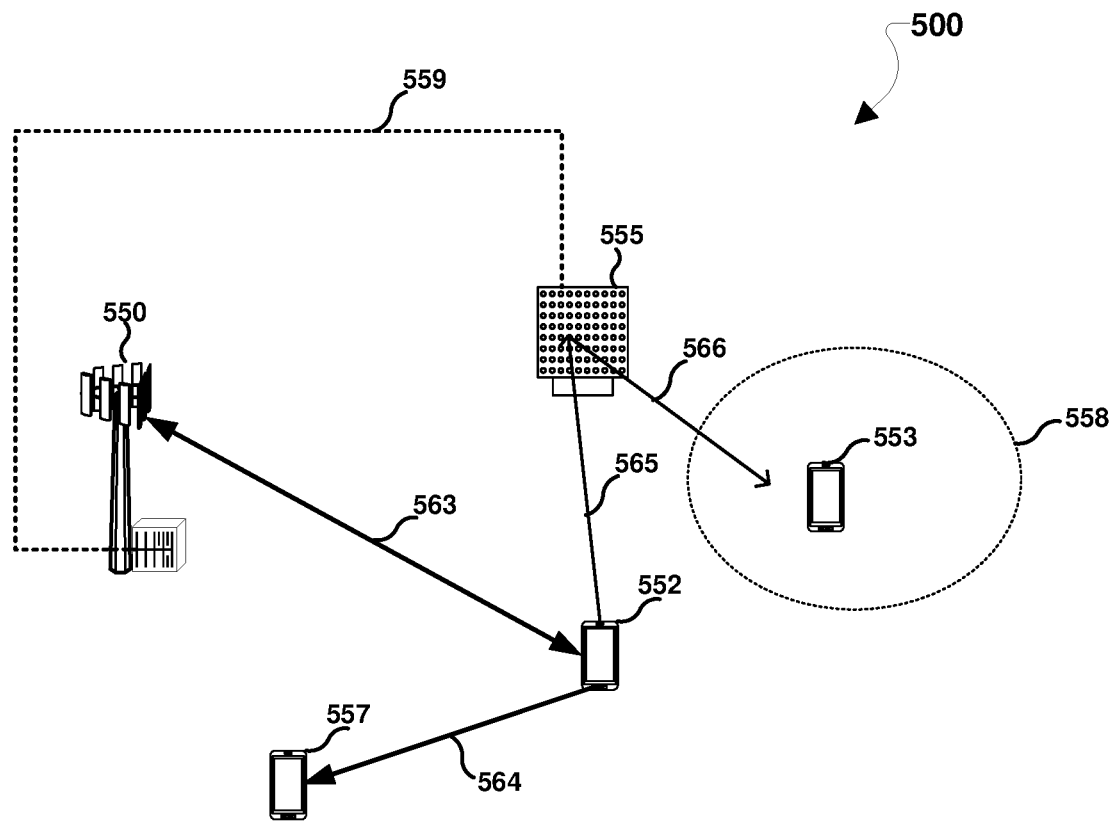
FIG. 5 is a system block diagram illustrating example operations for supporting directional security in a wireless network according to various embodiments.

FIG. 5 is a system block diagram illustrating example operations for supporting directional security in a wireless network (e.g., 100) according to various embodiments. With reference to FIGS. 1-5, a network device 550 (e.g., network device 110a-110d, 350) may control a RIS 555 (e.g., RIS 150, 400) via messages sent via a connection 559 (e.g., a wired or wireless connection 156).

The network device 550 may determine a geographic zone of interest 558. For example, the geographic zone of interest 558 may be an area surrounding a malicious UE 553 that may be eavesdropping on the network (e.g., 100). The RIS 555 may be associated with the geographic zone of interest 558 as the RIS 555 may be oriented such that reflected RF waves from a reflecting surface of the RIS 555 may be steered into the geographic zone of interest 558. The network device 550 may select the RIS 555 for use in providing directional security, such as directional PHY layer security, to the geographic zone of interest 558.

The UE 552 (e.g., UE 120a-120e, 320) may be transmitting sidelink communications 564 to the UE 557 (e.g., UE 120a-120e, 320). The sidelink communications 564 may include a communication signal transmitted from the UE 552 in the direction of UE 557, the intended receiver of the communication signal. The UE 552 and network device 550 may exchange communications 563 with one another. The exchange communications 563 may include DCI messages, media access control (MAC)-control element (CE)(MAC-CE) message, a radio resource control (RRC) messages, overhead signaling messages, etc. For example, communications 563 may include the UE 552 sending indications of the position of the UE 552, the position of the UE 557, the capability to support directional security, indexes of codebooks used for sidelink communications 564, QoS reports, PHR reports, etc. For example, communications 563 may include the network device 550 sending DCI signaling to the UE 552.

The network device 550 may select the UE 552 as a noise transmitting UE. The network device 550 may determine a direction and a power level for a noise signal to be transmitted by the UE 552. The direction may be the direction from the UE 552 to the RIS 555. The network device 550 may indicate the direction and the power level for the noise signal to the UE 552. For example, the directions and the power level for the noise signal may be indicated in a noise resource allocation sent from the network device 550 to the UE 552. The noise resource allocation may also indicate a noise parameter, such as an MCS, pseudo random code to generate the noise signal, slot-offset, etc. The UE 552 may generate a noise signal according to the indicated noise parameters.

The network device 550 may determine a direction from the RIS 555 to the geographic zone of interest 558 as a steering direction. The network device 550 may determine one or more steering parameters for the RIS 555 to use to steer a reflected noise signal from the UE 552 along the steering direction. The network device 550 may send an indication of the one or more steering parameters to the RIS 555, for example via the connection 559.

At a designated time, such as at a next transmission time, a next slot corresponding to an indicated slot-offset, etc., the UE 552 may transmit a communication signal of the sidelink communications 564 in the direction of the intended receiver UE 557 and while transmitting that communication signal may transmit a noise signal 565 in the direction of the RIS 555. The RIS 555 may control one or more elements of a reflecting surface of the RIS 555 to steer the noise signal 565 as a reflected noise signal 566 into the geographic zone of interest 558. The reflected noise signal 566 may cause interference to the malicious UE 553 thereby reducing the ability of the malicious UE 553 to eavesdrop on communications in the network.

Figure 6:
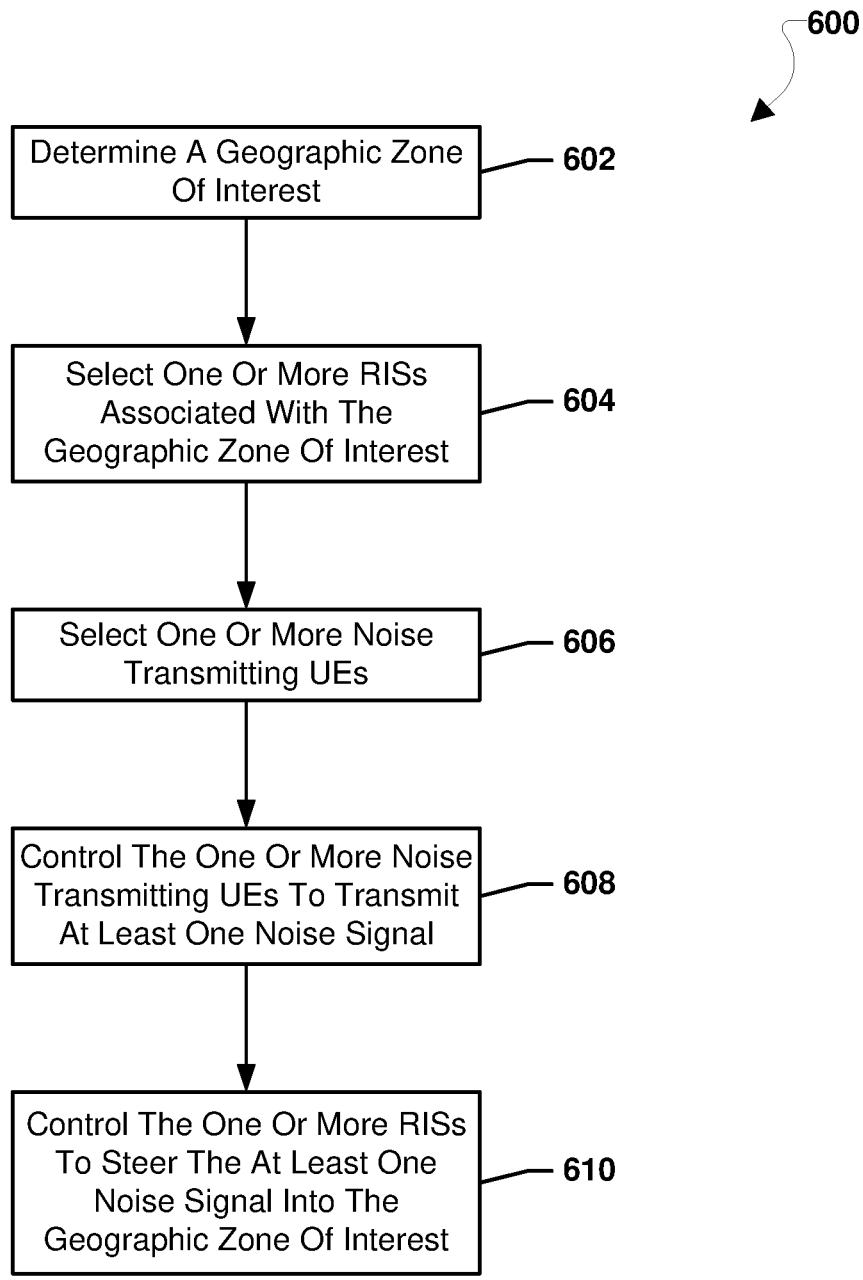
FIG. 6 is a process flow diagram illustrating a method for supporting directional security in a wireless network according to various embodiments.

FIG. 6 is a process flow diagram illustrating a method 600 for supporting directional security in a wireless network that may be performed by a processor of a network device according to various embodiments. With reference to FIGS. 1-6, the operations of the method 600 may be performed by a processor (such as the processor 210, 212, 214, 216, 218, 252, 260) of a network device (e.g., 110*a*, 110*d*, 350, 550 120*a*-120*e*, 320, 402).

In block 602, the processor may perform operations including determining a geographic zone of interest. For example, the geographic zone of interest may be an area surrounding a malicious UE that may be eavesdropping in network. A geographic zone of interest may be a geographic point (e.g., a point described by coordinates such as at least a latitude and a longitude), a geographic area (e.g., an area encompassed by a circle or other shape surrounding a geographic point), or other type geographic space into which one or more noise signals are to be transmitted. Means for performing the operations of block 602 may include the processor 210, 212, 214, 216, 218, 252, 260.

In block 604, the processor may perform operations including selecting one or more RISs (e.g., RIS 150, 400, 555) associated with the geographic zone of interest. A RIS associated with the geographic zone of interest may be a RIS that is oriented such that noise signals incident on the reflecting surface of the RIS may be steered by the RIS into the geographic zone of interest. For example, a RIS associated with the geographic zone may be a RIS with a face of a reflecting surface at least partially oriented toward the geographic zone of interest. A network device (e.g., a base station or other network node) may store configuration parameters of RISs under the control of the network device, such as reflecting surface orientations, RIS geographic positions, steering capabilities of the RIS, etc. The processor may compare attributes of the geographic zone of interest to configuration parameters of the RISs to select one or more RISs associated with the geographic zone of interest. Means for performing the operations of block 604 may include the processor 210, 212, 214, 216, 218, 252, 260.

In block 606, the processor may perform operations including selecting one or more noise transmitting UEs (e.g., UEs 120*a*-120*e*, 320, 552, 553, 555). Selecting one or more noise transmitting UEs may include various operations, such as selecting available UEs reporting support for cooperative directional security, selecting available UEs in position to transmit noise signals toward a RIS, selecting available UEs having a transmission metric meeting a noise transmission requirement, etc. The selection of one or more noise transmitting UEs may be based at least in part on reporting by the UEs, such as QoS reports, PHR reports, etc. Means for performing the operations of block 606 may include the processor 210, 212, 214, 216, 218, 252, 260.

In block 608, the processor may perform operations including sending commands or configuration messages to the one or more transmitting UEs to cause those UEs to transmit at least one noise signal. For example, the processor may send configuration messages to control a transmitting UE to transmit at least one noise signal by sending a noise resource message including a noise direction, noise parameter, and/or a noise power level. In response to receiving the noise resource, the UE may generate and send a noise signal according to the noise resource. In some embodiments, a UE may send a noise signal while sending a communication signal. In some embodiments, the UE may be preconfigured with noise parameters with which to generate a noise signal. In some embodiments, the UE may generate a noise signal according to noise parameters in a noise resource allocation message. Means for performing the operations of block 608 may include the processor 210, 212, 214, 216, 218, 252, 260 and/or the transceiver 256, 266.

In block 610, the processor may perform operations including controlling the one or more RISs to steer the at least one noise signal emitted by the selected noise transmitting UEs into the geographic zone of interest. For example, the processor may control a RIS to steer the at least one noise signal into the geographic zone of interest by sending one or more steering parameters, such as analog beamforming weights, to the RIS. In response to receiving the one or more steering parameters, the RIS may control one or more elements of a reflecting surface of the RIS to steer the at least one noise signal into the geographic zone of interest. Means for performing the operations of block 608 may include the processor 210, 212, 214, 216, 218, 252, 260 and/or the transceiver 256, 266.

Figure 7:
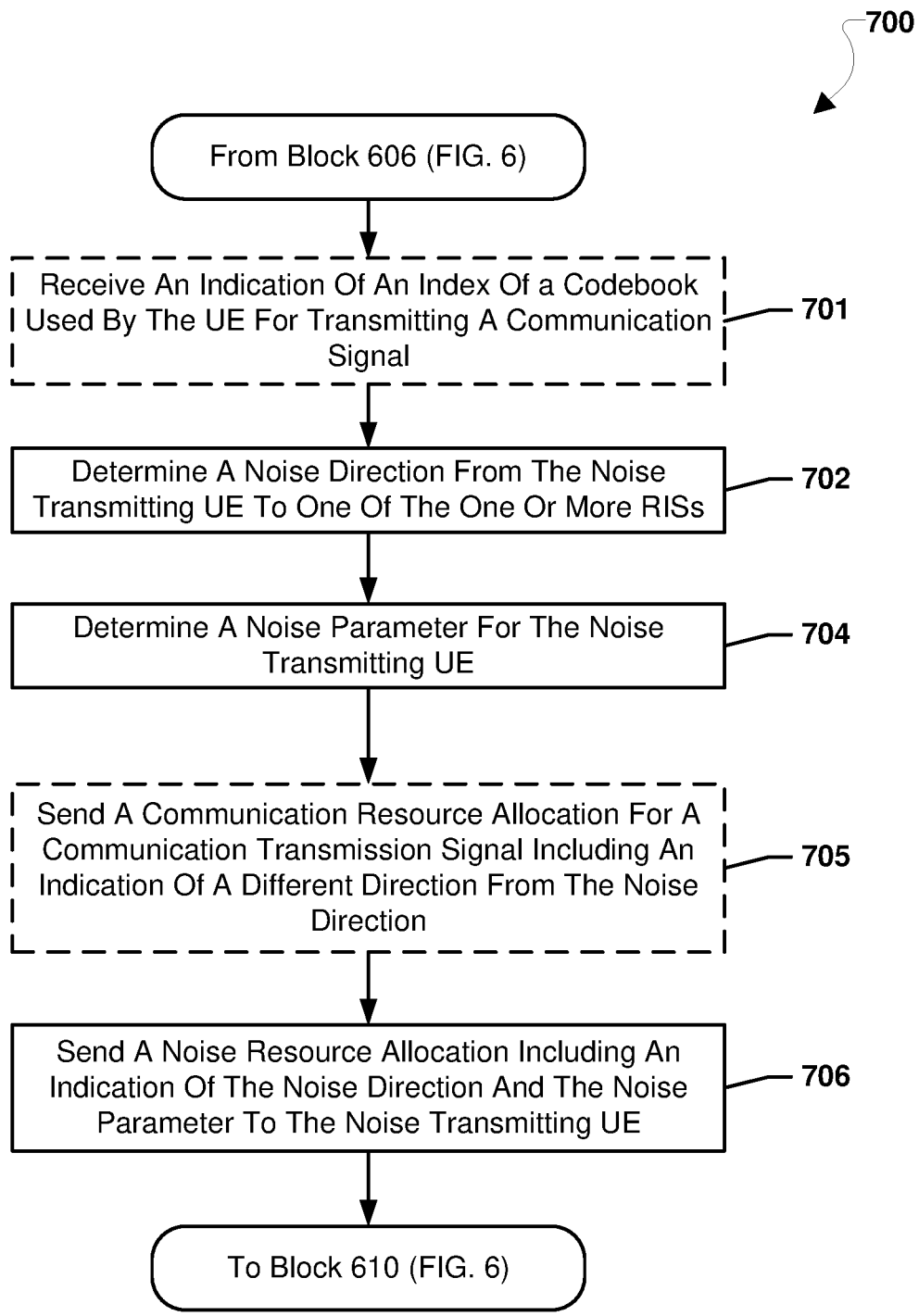
FIG. 7 is a process flow diagram illustrating a method for controlling one or more user equipments (UEs) according to various embodiments.

FIG. 7 is a process flow diagram illustrating a method 700 for controlling one or more user UEs that may be performed by a processor of a network device according to various embodiments. With reference to FIGS. 1-7, the operations of the method 700 may be performed by a processor (such as the processor 210, 212, 214, 216, 218, 252, 260) of a network device (e.g., 110*a*, 110*d*, 350, 550 120*a*-120*e*, 320, 402). In various embodiments, the operations of the method 700 may be performed in conjunction with the operations of the method 600 (FIG. 6). As an example, the operations of the method 700 may be performed as part of the operations of block 608 to control the one or more noise transmitting UEs to transmit at least one noise signal. In various embodiments, the operations of the method 700 may be performed on a per UE basis for each respective one of the one or more noise transmitting UEs.

In optional block 701, the processor may perform operations including receiving an indication of an index of a codebook used by the UE (e.g., UE 120a-120e, 320, 552, 553, 555) for transmitting a communication signal. A network device (e.g., a base station or other network node) may not facilitate sidelink communications by a UE. As such, the network device may not be aware of the codebook used by the UE for transmitting a communication signal in the sidelink communications. A UE supporting cooperative direction security may send the index of the codebook used for sidelink communications to the network device. The operations in block 701 may be optional, as during communications facilitated by the network device, such as a base station or other network node, the index of the codebook used for communications may be available to the network device. Means for performing the operations of block 608 may include the processor 210, 212, 214, 216, 218, 252, 260 and/or the transceiver 256, 266.

In block 702, the processor may perform operations including determining a noise direction from the noise transmitting UE to one of the one or more RISs. In some embodiments, the position of a UE may be known and the position of a RIS to use for reflecting a noise signal into a geographic zone of interest may be known. The processor may determine the noise direction as the direction from the UE position to the RIS position. Means for performing the operations of block 608 may include the processor 210, 212, 214, 216, 218, 252, 260.

In block 704, the processor may perform operations including determining a noise parameter for the noise transmitting UE. A noise parameter may include a modulation coding scheme (MCS) and/or a pseudorandom key for use in generating a noise signal. As another example, a noise parameter may include a slot-offset. The slot-offset may indicate after how many slots from receiving the DCI including the noise parameter the UE is to transmit a communication signal in a first direction and the noise signal in the noise direction. Means for performing the operations of block 608 may include the processor 210, 212, 214, 216, 218, 252, 260.

In optional block 705, the processor may perform operations including sending a communication resource allocation for a communication transmission signal including an indication of a different direction from the noise direction. When the UE is not conducting sidelink operations, the UE may receive a resource allocation for a communication signal including a direction from the network device (e.g., a base station or other network node). The operations in block 705 may be optional as UEs performing sidelink communications may not be allocated communication resources by the network device, such as a base station or other network node. Means for performing the operations of block 705 may include the processor 210, 212, 214, 216, 218, 252, 260 and/or the transceiver 256, 266.

In block 706, the processor may perform operations including sending a noise resource allocation message to the noise transmitting UE including an indication of the noise direction and the noise parameter. The noise resource allocation message may include an indication of a noise direction, a noise parameter, and/or a noise power level. The noise resource allocation message may be (or may be sent in) a DCI transmitted to the noise transmitting UE. Means for performing the operations of block 608 may include the processor 210, 212, 214, 216, 218, 252, 260 and/or the transceiver 256, 266.

In response to sending the noise resource allocation message, the processor may perform the operations in block 610 of method 600 (FIG. 6).

Figure 8:
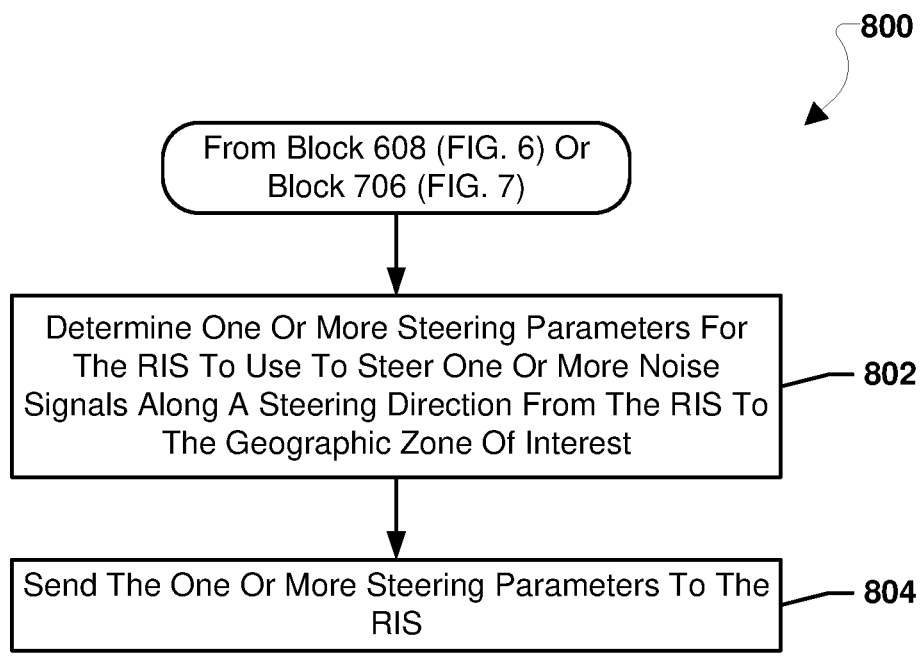
FIG. 8 is a process flow diagram illustrating a method for controlling one or more RISs according to various embodiments.

FIG. 8 is a process flow diagram illustrating a method 800 for controlling one or more RISs that may be performed by a processor of a network device according to various embodiments. With reference to FIGS. 1-8, the operations of the method 800 may be performed by a processor (such as the processor 210, 212, 214, 216, 218, 252, 260) of a network device (e.g., 110a, 110d, 350, 550 120a-120e, 320, 402). In various embodiments, the operations of the method 800 may be performed in conjunction with the operations of the method 600 (FIG. 6) and/or method 700 (FIG. 7). As an example, the operations of the method 800 may be performed as part of the operations of block 610 to control the one or more RISs to steer the at least one noise signal into the geographic zone of interest. In various embodiments, the operations of the method 800 may be performed on a per RIS basis for each respective one of the one or more RISs.

In block 802, the processor may perform operations including determining one or more steering parameters for the RIS to use to steer one or more noise signals along a steering direction from the RIS to the geographic zone of interest. Steering parameters may include various parameters related to steering a reflected RF wave into a geographic zone of interest, such as analog beamforming weights, selected angles of reflection, selected directions, etc. that a processor (e.g., 403) of the RIS can use to configure the phase-shifting circuit elements (e.g., 474). The steering direction may be a direction from the RIS to the geographic zone of interest. The steering parameters may be the parameters for setting the RIS to reflect one or more noise signals from one or more noise transmitting UEs along the steering direction and into the geographic zone of interest. Means for performing the operations of block 802 may include the processor 210, 212, 214, 216, 218, 252, 260.

In block 804, the processor may send the one or more steering parameters to the RIS. For example, the one or more steering parameters may be sent via a connection (e.g., 156, 559) between the network device (e.g., a base station or other network node) and the RIS. Means for performing the operations of block 705 may include the processor 210, 212, 214, 216, 218, 252, 260 and/or the transceiver 256, 266.

Figure 9:
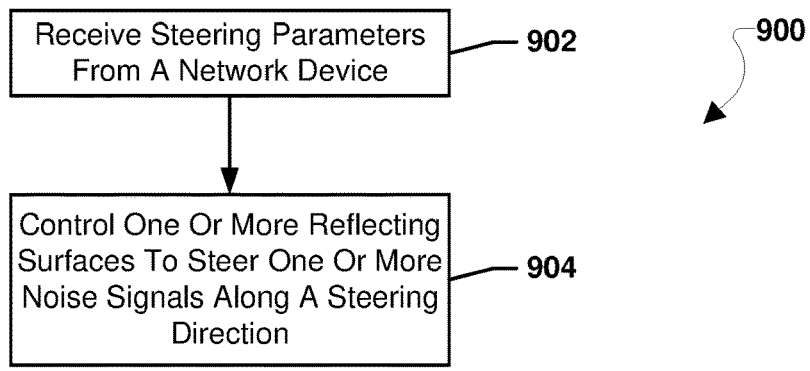
FIG. 9 is a process flow diagram illustrating a method for supporting directional security in a wireless network according to various embodiments.

FIG. 9 is a process flow diagram illustrating a method 900 for supporting directional security in a wireless network that may be performed by a processor of a RIS according to various embodiments. With reference to FIGS. 1-9, the operations of the method 900 may be performed by a processor (such as the processor 403) of a RIS (such as the RIS 150, 400, 555). In various embodiments, the operations of the method 900 may be performed in conjunction with the operations of the method 600 (FIG. 6), method 700 (FIG. 7), and/or method 800 (FIG. 8).

In block 902, the processor may perform operations including receiving steering parameters from a network device (e.g., 110a-110d, 350, 550). For example, the one or more steering parameters may be received via a connection (e.g., 156, 559) between the RIS and a network device. Steering parameters may include various parameters related to steering a reflected RF wave into a geographic zone of interest, such as analog beamforming weights, selected angles of reflection, selected directions, etc. The steering direction may be a direction from the RIS to the geographic zone of interest. The steering parameters may be the parameters for setting the RIS to reflect one or more noise signals from one or more noise transmitting UEs along the steering direction and into the geographic zone of interest. Means for performing the operations of block 802 may include the processor 403 and/or network access port 405.

In block 904, the processor may perform operations including configuring the phase-shifting circuit elements (e.g., 474) of reflecting surfaces (e.g., reflecting surface 402) to steer one or more noise signals along a steering direction. For example, the processor may provide current and/or voltages and/or control signals to the phase-shifting circuit elements (e.g., 474) of the reflective surface to control the phase shift imparted by a phase shift controller of one or more elements (e.g., 460) of the reflecting surface to change a phase of a RF wave (or RF signal), such as a noise signal, incident on the reflective surface. By adjusting the phase shift of reflected RF waves, the RF wave reflected from the reflecting surface may be directed along the steering direction. Means for performing the operations of block 802 may include the processor 403 and/or reflecting surface 402 and/or elements 460.

Figure 10:
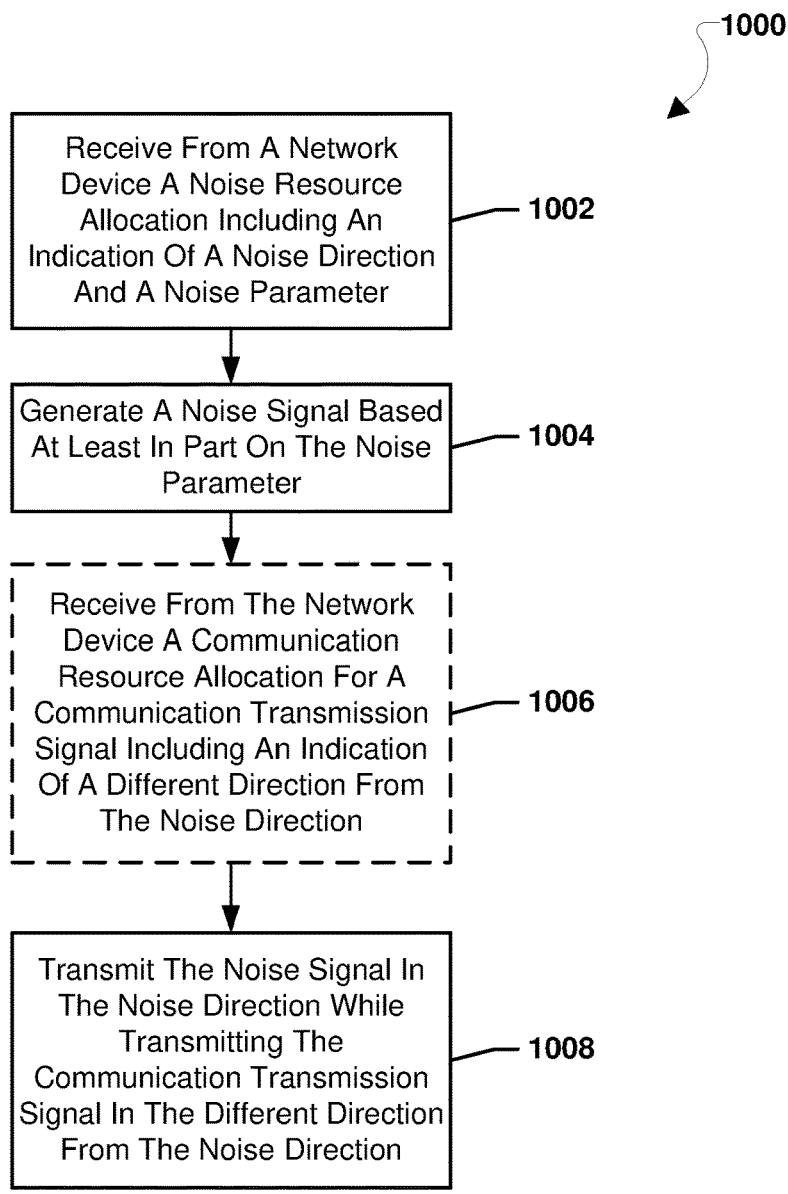
FIG. 10 is a process flow diagram illustrating a method for supporting directional security in a wireless network according to various embodiments.

FIG. 10 is a process flow diagram illustrating a method 1000 for supporting directional security in a wireless network that may be performed by a processor of a UE according to various embodiments. With reference to FIGS. 1-10, the operations of the method 1000 may be performed by a processor (such as the processor 210, 212, 214, 216, 218, 252, 260) of a wireless communication device or UE (such as UE 120a-120e, 320, 552, 553, 555). In various embodiments, the operations of the method 1000 may be performed in conjunction with the operations of the method 600 (FIG. 6), method 700 (FIG. 7), method 800 (FIG. 8), and/or method 900 (FIG. 9).

In block 1002, the processor may perform operations including receiving from a network device a noise resource allocation including an indication of a noise direction and a noise parameter. In some embodiments, the noise resource allocation may be received in a noise resource allocation message. In some embodiments, the noise resource allocation may be received in DCI sent by the network device to the UE. The noise resource allocation may include an indication of a noise direction and a noise parameter. The noise direction may be the direction from the UE position to a RIS position. A noise parameter may include a modulation coding scheme (MCS) and/or a pseudorandom key for use in generating a noise signal. As another example, a noise parameter may include a slot-offset. The slot-offset may indicate after how many slots from receiving the DCI including the noise parameter that the UE is to transmit a communication signal in a first direction and the noise signal in the noise direction. Means for performing the operations of block 1002 may include the processor 210, 212, 214, 216, 218, 252, 260 and/or the transceiver 256, 266.

In block 1004, the processor may perform operations including generating a noise signal based at least in part on the noise parameter. For example, the processor may generate a noise signal according to the MCS and/or using the pseudorandom key provided by the network device. Means for performing the operations of block 1002 may include the processor 210, 212, 214, 216, 218, 252, 260.

In optional block 1006, the processor may perform operations including receiving from the network device a communication resource allocation for a communication transmission signal including an indication of a different direction from the noise direction. In some embodiments, the communication resource allocation may be received in a communication resource allocation message. In some embodiments, the communication resource allocation may be received in DCI sent by the network device to the UE. When the UE is not conducting sidelink operations, the UE may receive a resource allocation for a communication signal including a direction from the network device, such as a base station or other network node. Block 1006 may be optional as UEs performing sidelink communications may not be allocated communication resources by the network device, such as a base station or other network node. Means for performing the operations of block 1006 may include the processor 210, 212, 214, 216, 218, 252, 260 and/or the transceiver 256, 266.

In block 1008, the processor may perform operations including transmitting the noise signal in the noise direction while transmitting the communication transmission signal in the different direction (i.e., a direction different from the noise direction). The UE participating in cooperative directional security may transmit the UE's intended communication signal along a first direction that is different than the noise direction, such as a first direction toward a position of the intended receiver of the communication. As examples, the intended communication signal may be an uplink or sidelink transmission signal. While transmitting the UE's intended communication signal, the UE may also transmit a noise signal in the noise direction. The noise signal may be an additional signal not used for communication, such as an artificial noise signal or other non-information carrying signal. The noise direction may be a second direction that may be a direction different than the first direction, such as a direction orthogonal to the first direction, a direction outside of a main lobe of the UE's intended communication signal, etc. Means for performing the operations of block 1006 may include the processor 210, 212, 214, 216, 218, 252, 260 and/or the transceiver 256, 266.

Figure 11:
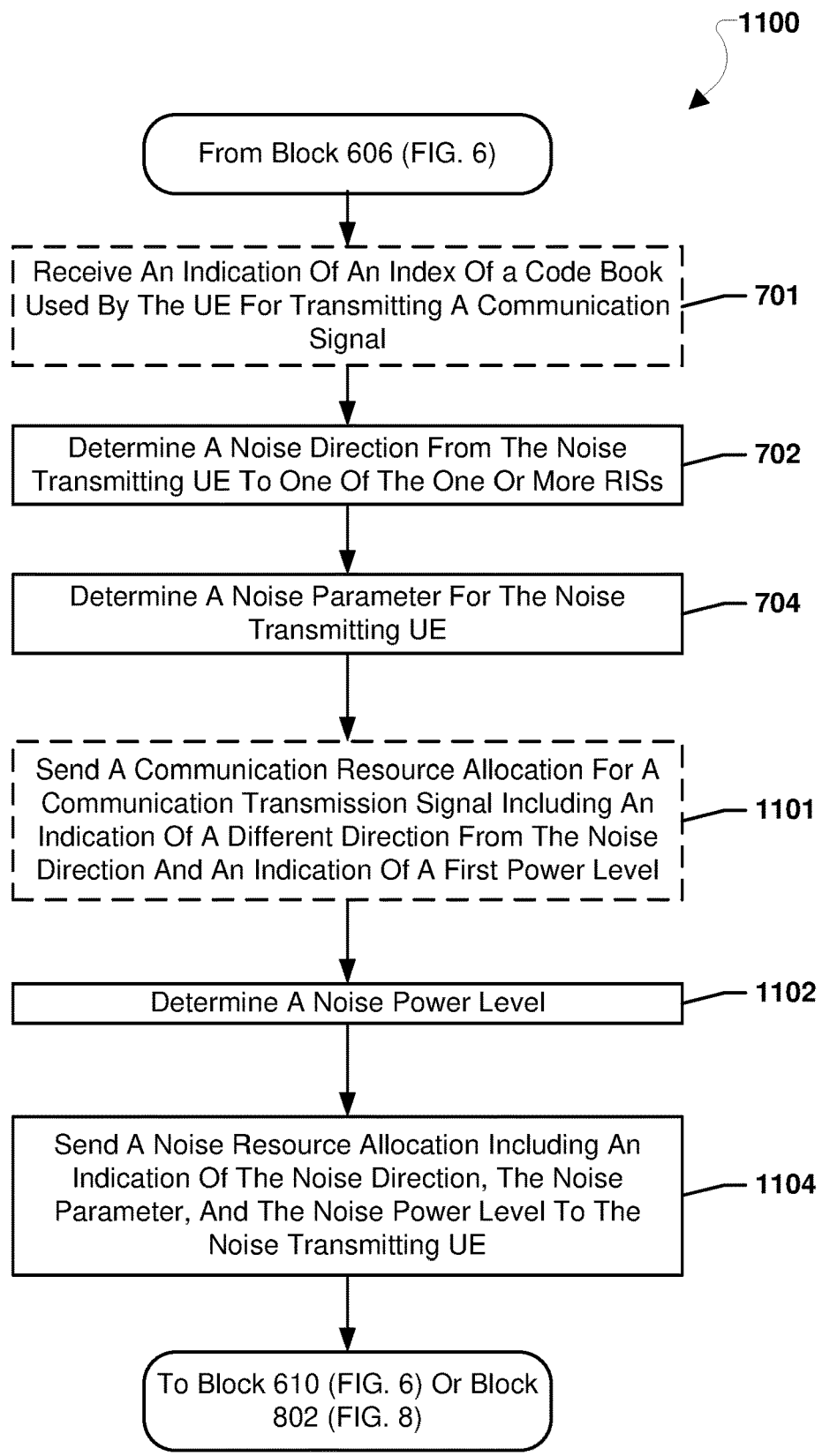
FIG. 11 is a process flow diagram illustrating a method for controlling one or more UEs according to various embodiments.

FIG. 11 is a process flow diagram illustrating a method 1100 for controlling one or more user UEs that may be performed by a processor of a network device according to some embodiments. With reference to FIGS. 1-11, the operations of the method 1100 may be performed by a processor (such as the processor 210, 212, 214, 216, 218, 252, 260) of a network device (e.g., 110a, 110d, 350, 550 120a-120e, 320, 402). In some embodiments, the operations of the method 1100 may be performed in conjunction with the operations of the method 600 (FIG. 6), method 700 (FIG. 7), method 800 (FIG. 8), method 900 (FIG. 9), and/or method 1000 (FIG. 10). As an example, the operations of the method 1100 may be performed as part of the operations of block 608 to control the one or more noise transmitting UEs to transmit at least one noise signal. In various embodiments, the operations of the method 1100 may be performed on a per UE basis for each respective one of the one or more noise transmitting UEs.

In optional block 701, block 702, and block 704, the processor may perform operations as described with reference to like numbered blocks of the method 700 (FIG. 7).

In optional block 1101, the processor may perform operations including sending a communication resource allocation for a communication transmission signal including an indication of a different direction from the noise direction and an indication of a first power level. When the UE is not conducting sidelink operations, the UE may receive a resource allocation for a communication signal including a direction or a power level from the network device, such as a base station or other network node. Block 705 may be optional as UEs performing sidelink communications may not be allocated communication resources by the network device, such as a base station or other network node. Means for performing the operations of block 1101 may include the processor 210, 212, 214, 216, 218, 252, 260 and/or the transceiver 256, 266.

In block 1102, the processor may perform operations including determining a noise power level. The noise power level may be based on the capabilities of the UE to generate the noise signal. For example, the noise power level may be selected to be less than the power head room reported by the UE to generate the noise signal. Means for performing the operations of block 1102 may include the processor 210, 212, 214, 216, 218, 252, 260

In block 1104, the processor may perform operations including sending a noise resource allocation including an indication of the noise direction, the noise parameter, and the noise power level to the noise transmitting UE. The noise resource allocation may include an indication of a noise direction, a noise parameter, and/or a noise power level. In some embodiments, the noise resource allocation may be sent in a noise resource allocation message. In some embodiments, the noise resource allocation may be sent in DCI to the noise transmitting UE. Means for performing the operations of block 1104 may include the processor 210, 212, 214, 216, 218, 252, 260 and/or the transceiver 256, 266.

In response to sending the noise resource allocation, the processor may perform the operations in block 610 of method 600 (FIG. 6) or block 802 of method 800 (FIG. 8).

Figure 12:
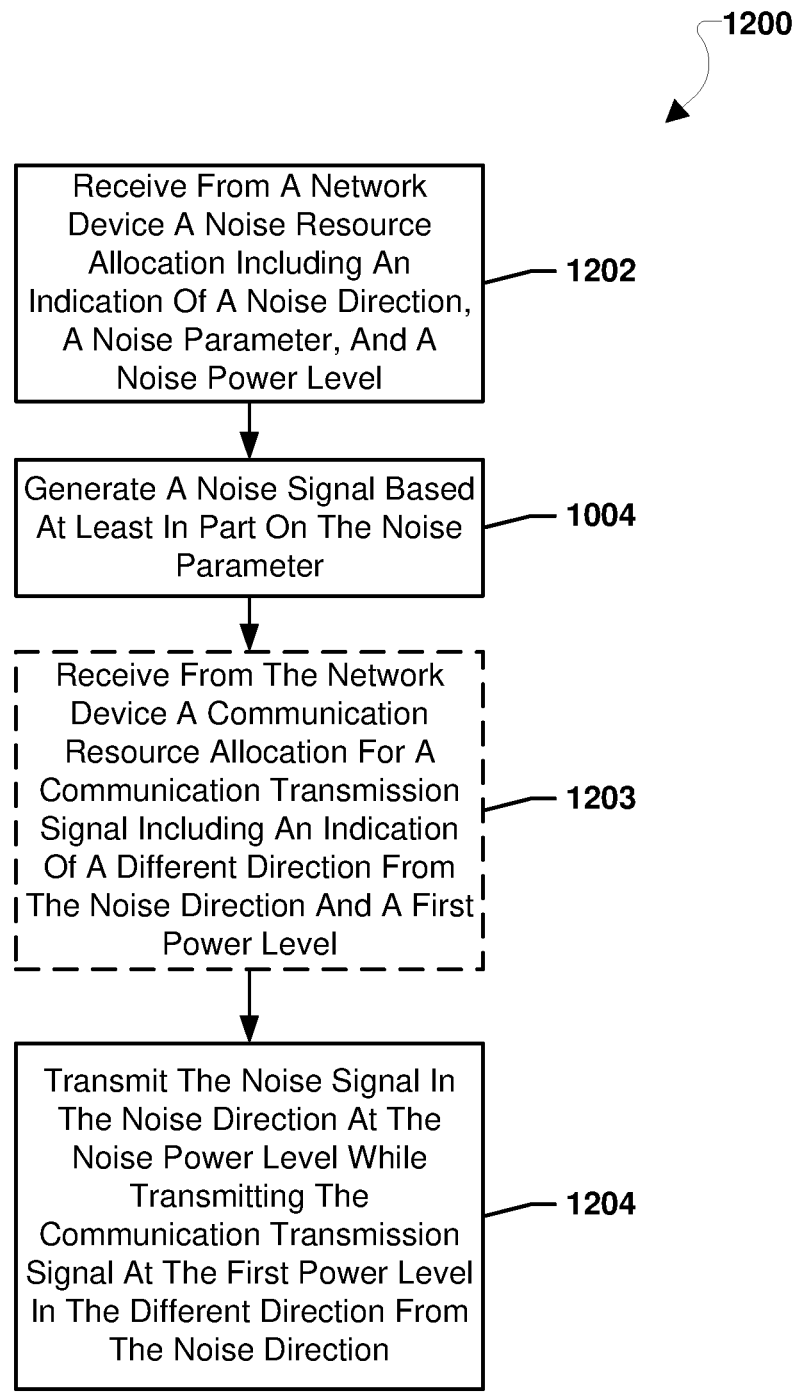
FIG. 12 is a process flow diagram illustrating a method for supporting directional security in a wireless network according to various embodiments.

FIG. 12 is a process flow diagram illustrating a method 1200 for supporting directional security in a wireless network that may be performed by a processor of a UE according to various embodiments. With reference to FIGS. 1-12, the operations of the method 1200 may be performed by a processor (such as the processor 210, 212, 214, 216, 218, 252, 260) of a UE (such as UE 120a-120e, 320, 552, 553, 555). In various embodiments, the operations of the method 1200 may be performed in conjunction with the operations of the method 600 (FIG. 6), method 700 (FIG. 7), method 800 (FIG. 8), method 900 (FIG. 9), method 1000 (FIG. 10), and/or method 1100 (FIG. 11).

In block 1202, the processor may perform operations including receiving from a network device a noise resource allocation including an indication of a noise direction, a noise parameter, and a noise power level. In some embodiments, the noise resource allocation may be received in DCI sent by the network device to the UE. The noise resource allocation may include an indication of a noise direction and a noise parameter. The noise direction may be the direction from the UE position to a RIS position. A noise parameter may include a modulation coding scheme (MCS) and/or a pseudorandom key for use in generating a noise signal. As another example, a noise parameter may include a slot-offset. The slot-offset may indicate after how many slots from receiving the DCI including the noise parameter the UE is to transmit a communication signal in a first direction and the noise signal in the noise direction. The noise power level may indicate the power level to be used by the UE in transmitting the noise signal. Means for performing the operations of block 1202 may include the processor 210, 212, 214, 216, 218, 252, 260 and/or the transceiver 256, 266.

In block 1004, the processor may perform operations including generating a noise signal based at least in part on the noise parameter as described with reference to like numbered block of the method 1000 (FIG. 10).

In optional block 1203, the processor may perform operations including receiving from the network device a communication resource allocation for a communication transmission signal including an indication of a different direction from the noise direction and a first power level. When the UE is not conducting sidelink operations, the UE may receive a resource allocation for a communication signal including a direction and power level to use for a communications signal from the network device, such as the network device. Block 1203 may be optional as UEs performing sidelink communications may not be allocated communication resources by the network device, such as a base station or other network node. Means for performing the operations of block 1203 may include the processor 210, 212, 214, 216, 218, 252, 260 and/or the transceiver 256, 266.

In block 1204, the processor may perform operations including transmitting the noise signal in the noise direction at the noise power level while transmitting the communication transmission signal at the first power level in the different direction from the noise direction. The UE participating in cooperative directional security may transmit the UE's intended communication signal along a first direction and first power level that is different than the noise direction, such as a first direction toward a position of the intended receiver of the communication. As examples, the intended communication signal may be an uplink or sidelink transmission signal. While transmitting the UE's intended communication signal, the UE may also transmit a noise signal in the noise direction at the noise power level. The noise signal may be an additional signal not used for communication, such as an artificial noise signal or other non-information carrying signal. The noise direction may be a second direction that may be a direction different than the first direction, such as a direction orthogonal to the first direction, a direction outside of a main lobe of the UE's intended communication signal, etc. As examples, the noise power level may be the same as the first power level or lower than the first power level. Means for performing the operations of block 1204 may include the processor 210, 212, 214, 216, 218, 252, 260 and/or the transceiver 256, 266.

Figure 13:
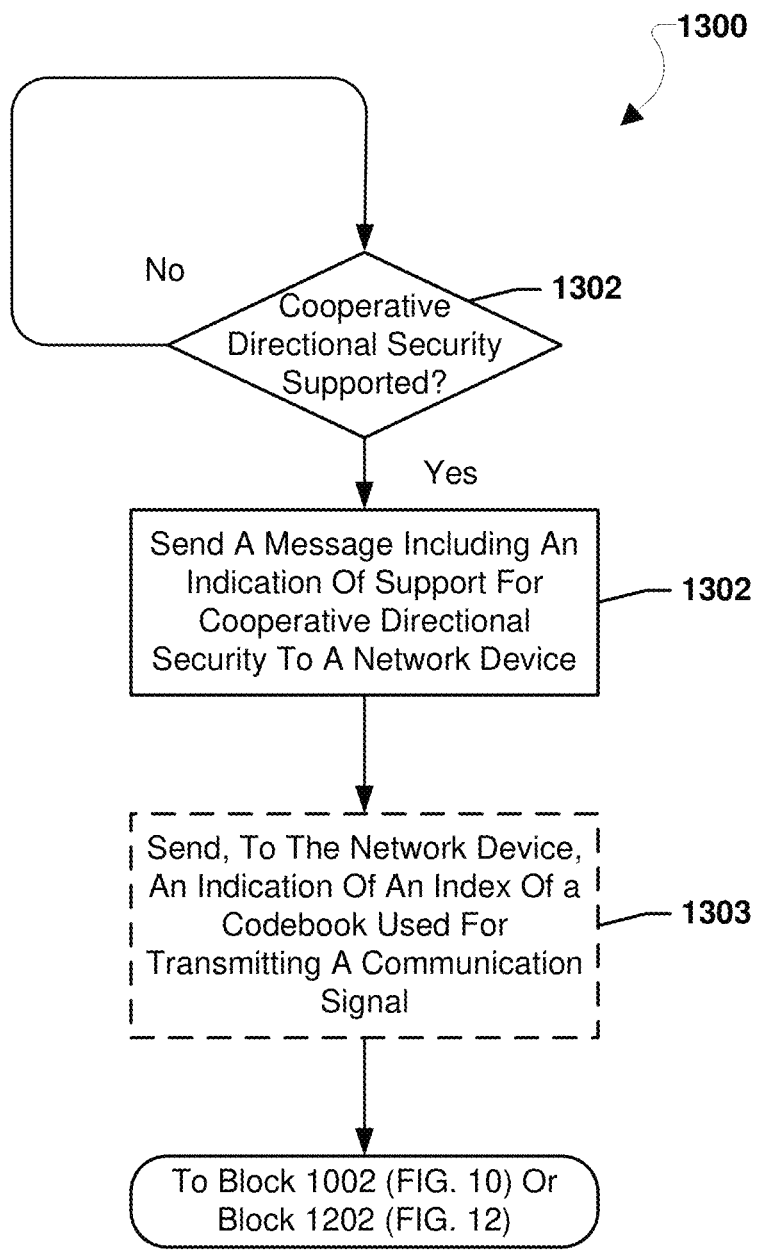
FIG. 13 is a process flow diagram illustrating a method for supporting directional security in a wireless network according to various embodiments.

FIG. 13 is a process flow diagram illustrating a method 1300 for supporting directional security in a wireless network that may be performed by a processor of a UE according to various embodiments. With reference to FIGS. 1-13, the operations of the method 1300 may be performed by a processor (such as the processor 210, 212, 214, 216, 218, 252, 260) of a UE (such as UE 120a-120e, 320, 552, 553, 555). In various embodiments, the operations of the method 1300 may be performed in conjunction with the operations of the method 600 (FIG. 6), method 700 (FIG. 7), method 800 (FIG. 8), method 900 (FIG. 9), method 1000 (FIG. 10), method 1100 (FIG. 11), and/or method 1200 (FIG. 12).

In determination block 1302, the processor may perform operations including determining whether cooperative directional security is supported. As an example, UE may determine whether a device setting or configuration indicates cooperative directional security is supported. Means for performing the operations of block 1302 may include the processor 210, 212, 214, 216, 218, 252, 260.

In response to determining that cooperative directional security is not supported (i.e., determination block 1302="No"), the processor may continue to perform operations including determining whether cooperative directional security is supported in determination block 1302.

In response to determining that cooperative directional security is supported (i.e., determination block 1302="Yes"), the processor may perform operations including sending a message including an indication of support for cooperative directional security to a network device in block 1302. As an example, UEs may be pre-configured to support cooperative directional security and may pre-signal a capability to participate using a message, such as a media access control (MAC)-control element (CE)(MAC-CE) message, a radio resource control (RRC) message, etc., sent to a network device, such as a base station or other network node. The message sent by the UE may include a one-bit indication of a willingness or capability of the UE to participate in cooperative directional security. Means for performing the operations of block 1302 may include the processor 210, 212, 214, 216, 218, 252, 260 and/or the transceiver 256, 266.

In optional block 1303, the processor may perform operations including sending, to the network device, an indication of an index of a codebook used for transmitting a communication signal. A UE capable of participating in cooperative directional security may be communicating in a sidelink to an intended receiver. The UE may provide to a network device (e.g., a base station or other network node) an index of the codebook that the UE is using for the intended direction to the receiver device in the sidelink. As a network device may not facilitate the sidelink communications, the indication of the codebook index may enable the network device to determine the codebook used for the sidelink communications. Block 1303 may be optional as the codebook used by UEs not participating in sidelink communications may be already known to the network device. Means for performing the operations of block 1303 may include the processor 210, 212, 214, 216, 218, 252, 260 and/or the transceiver 256, 266.

In response to sending the message including the indication of support for cooperative directional security or in response to sending the indication of an index of a codebook, the processor may perform the operations in block 1002 of method 1000 (FIG. 10) or block 1002 of method 1000 (FIG. 12) as described.

Figure 14:
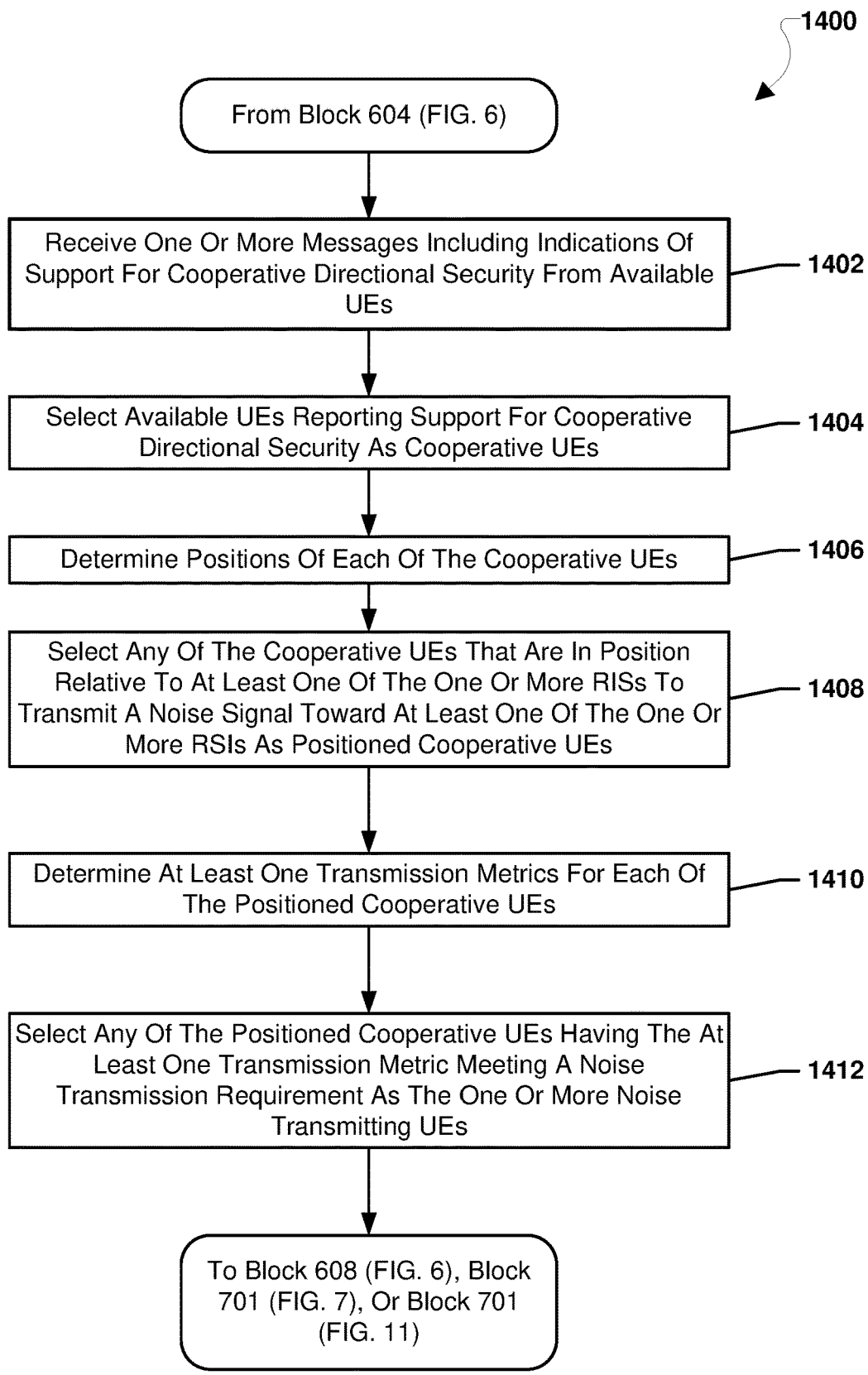
FIG. 14 is a process flow diagram illustrating a method for selecting one or more UEs according to various embodiments.

FIG. 14 is a process flow diagram illustrating a method 1400 for selecting one or more UEs that may be performed by a processor of a network device according to various embodiments. With reference to FIGS. 1-14, the operations of the method 1400 may be performed by a processor (such as the processor 210, 212, 214, 216, 218, 252, 260) of a network device (e.g., 110a, 110d, 350, 550 120a-120e, 320, 402). In various embodiments, the operations of the method 1400 may be performed in conjunction with the operations of the method 600 (FIG. 6), method 700 (FIG. 7), method 800 (FIG. 8), method 900 (FIG. 9), method 1000 (FIG. 10), method 1100 (FIG. 11), method 1200 (FIG. 12), and/or method 1300 (FIG. 13). As an example, the operations of the method 1400 may be performed as part of the operations of block 606 to select one or more noise transmitting UEs (e.g., UEs 120a-120e, 320, 552, 553, 555).

In block 1402, the processor may perform operations including receiving one or more messages including indications of support for cooperative directional security from available UEs. As an example, UEs may be pre-configured to support cooperative directional security and may pre-signal a capability to participate using a message, such as a media access control (MAC)-control element (CE) (MAC-CE) message, a radio resource control (RRC) message, etc., sent to a network device, such as a base station or other network node. In some embodiments, the message sent by the UE may include a one-bit indication of a willingness or capability of the UE to participate in cooperative directional security. Available UEs may be UEs with a cell served by a network device and/or UEs communicating with a network device. Means for performing the operations of block 1402 may include the processor 210, 212, 214, 216, 218, 252, 260 and/or the transceiver 256, 266.

In block 1404, the processor may perform operations including selecting available UEs reporting support for cooperative directional security as cooperative UEs. Selecting cooperative UEs may distinguish UEs capable of supporting cooperative directional security from those that cannot support cooperative directional security. Means for performing the operations of block 1404 may include the processor 210, 212, 214, 216, 218, 252, 260.

In block 1406, the processor may perform operations including determining positions of each of the cooperative UEs. For example, a network device may parse location reporting information from the cooperative UEs to determine the location of each cooperative UE. Means for performing the operations of block 1406 may include the processor 210, 212, 214, 216, 218, 252, 260.

In block 1408, the processor may perform operations including selecting any of the supporting UEs that are in a position relative to at least one of the one or more RISs to transmit a noise signal toward at least one of the one or more RISs as positioned cooperative UEs. For example, the network device may compare the position of the cooperative UEs to the positions of the one or more RISs to determine whether the distance from, and/or orientation to, the one or more RISs of the cooperative UEs is such that noise signals from those UEs may be steered into a geographic zone of interest. Those UEs that are positioned relative to the one or more RISs such that noise signals may be steered into a geographic zone of interest may be selected as positioned cooperative UEs. Means for performing the operations of block 1408 may include the processor 210, 212, 214, 216, 218, 252, 260.

In block 1410, the processor may perform operations including determining at least one transmission metric for each of the positioned cooperative UEs. Transmission metrics may include QoS metrics (e.g., block error rate, buffer status, etc.), PHR values, or any other metrics reported by, or about, UEs. Transmission metrics may be based at least in part on reporting by the UEs, such as QoS reports, PHR reports, etc. Means for performing the operations of block 1410 may include the processor 210, 212, 214, 216, 218, 252, 260.

In block 1412, the processor may perform operations including selecting any of the positioned cooperative UEs having the at least one transmission metric meeting a noise transmission requirement as the one or more noise transmitting UEs. Noise transmission requirements may be thresholds for transmission metrics that must be meet by a UE. As examples, noise transmission requirements may include minimum block error rates, minimum buffer statuses, threshold power leakages, a minimum power head, etc. UEs meeting the one or more noise transmitting metrics may be selected as noise transmitting UEs. Means for performing the operations of block 1412 may include the processor 210, 212, 214, 216, 218, 252, 260.

In response to selecting one or more noise transmitting UEs, the processor may perform the operations in block 608 of the method 600 (FIG. 6), or block 701 of the method 700 (FIG. 7), or block 701 of the method 1100 (FIG. 11) as described.

Figure 15:
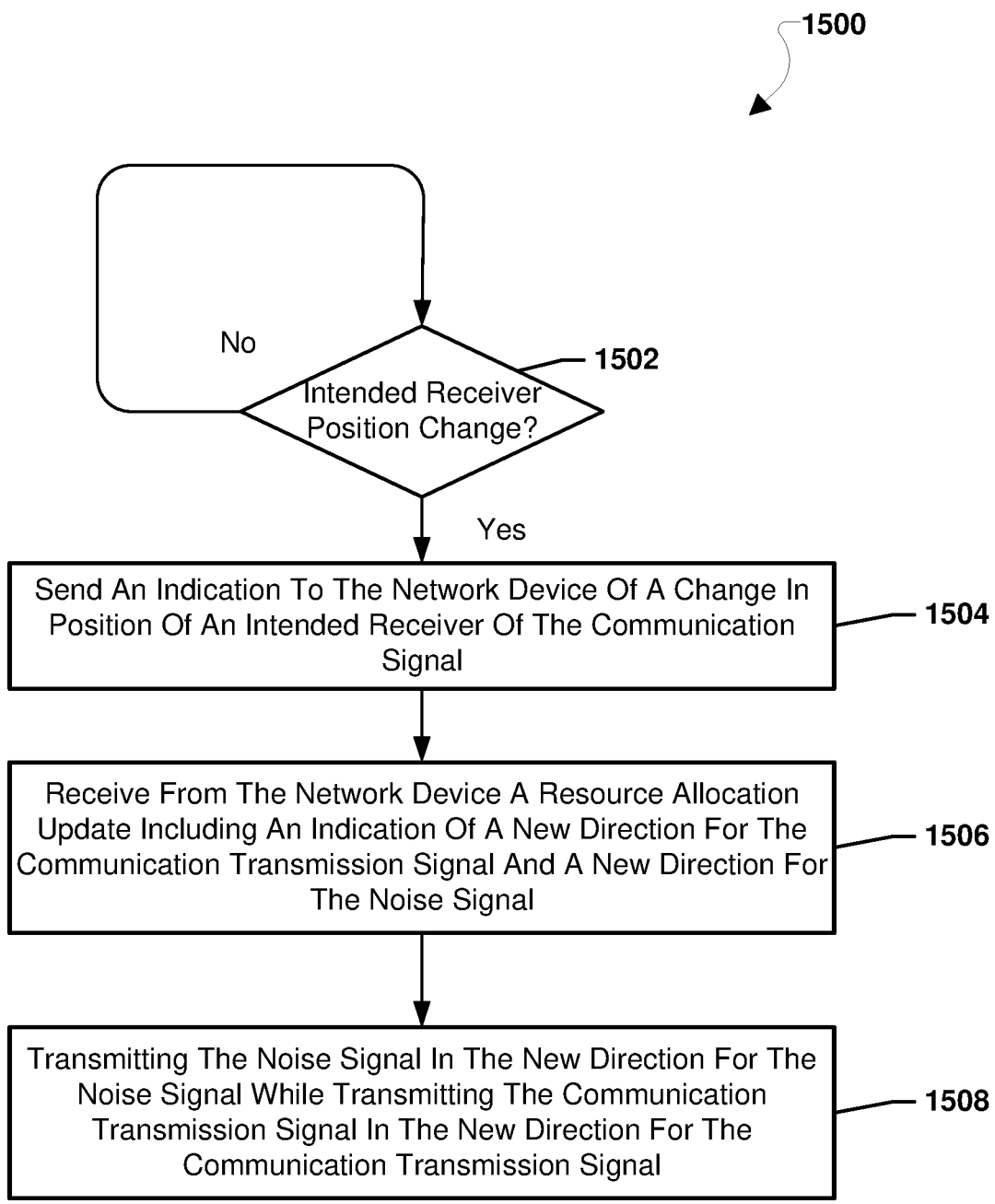
FIG. 15 is a process flow diagram illustrating a method for supporting directional security in a wireless network according to various embodiments.

FIG. 15 is a process flow diagram illustrating a method 1500 for supporting directional security in a wireless network that may be performed by a processor of a UE according to various embodiments. With reference to FIGS. 1-15, the operations of the method 1500 may be performed by a processor (such as the processor 210, 212, 214, 216, 218, 252, 260) of a UE (such as UE 120a-120e, 320, 552, 553, 555). In various embodiments, the operations of the method 1500 may be performed in conjunction with the operations of the method 600 (FIG. 6), method 700 (FIG. 7), method 800 (FIG. 8), method 900 (FIG. 9), method 1000 (FIG. 10), method 1100 (FIG. 11), method 1200 (FIG. 12), method 1300 (FIG. 13), and/or method 1400 (FIG. 14).

In determination block 1502, the processor may perform operations including determining whether an intended receiver's position has changed. A UE selected to participate in cooperative directional security may determine whether a location of an intended receiver has changed more than a threshold. The change in position of the intended receiver may be signaled by the intended receiver. Means for performing the operations of block 1502 may include the processor 210, 212, 214, 216, 218, 252, 260.

In response to determining that the intended receiver's position has not changed (i.e., determination block 1502="No"), the processor may continue to perform operations including determining whether an intended receiver's position has changed in determination block 1502.

In response to determining that the intended receiver's position has changed (i.e., determination block 1502="Yes"), the processor may perform operations including sending an indication to the network device of a change in position of an intended receiver of the communication transmission signal in block 1504. The change in position of the intended receiver may trigger a report to the network device, such as a base station or other network node. The report may include a new or updated location of the intended receiver. Means for performing the operations of block 1502 may include the processor 210, 212, 214, 216, 218, 252, 260 and/or the transceiver 256, 266.

In block 1506, the processor may perform operations including receiving from the network device a resource allocation update including an indication of a new direction for the communication transmission signal and a new direction for the noise signal. Based on the new or updated location of the intended receiver, the network device (e.g., a base station or other network node) may update a noise direction, a noise power level, and/or a noise parameter for the UE selected to participate in cooperative directional security and provide the updated noise direction, noise power level, and/or noise parameters to the UE. The resource allocation update may be received in one or more DCI messages. In some embodiments, the new direction for the communication transmission signal may be different than the new direction for the noise signal and the new direction for the noise signal may be the same or different than the previous noise direction. Means for performing the operations of block 1502 may include the processor 210, 212, 214, 216, 218, 252, 260 and/or the transceiver 256, 266.

In block 1508, the processor may perform operations including transmitting the noise signal in the new direction for the noise signal while transmitting the communication transmission signal in the new direction for the communication transmission signal. The UE participating in cooperative directional security may transmit the UE's intended communication signal along a direction toward the new position of the intended receiver. As examples, the intended communication signal may be an uplink or sidelink transmission signal. While transmitting the UE's intended communication signal, the UE may also transmit the noise signal in the new noise direction. Means for performing the operations of block 1508 may include the processor 210, 212, 214, 216, 218, 252, 260 and/or the transceiver 256, 266.

Figure 16:
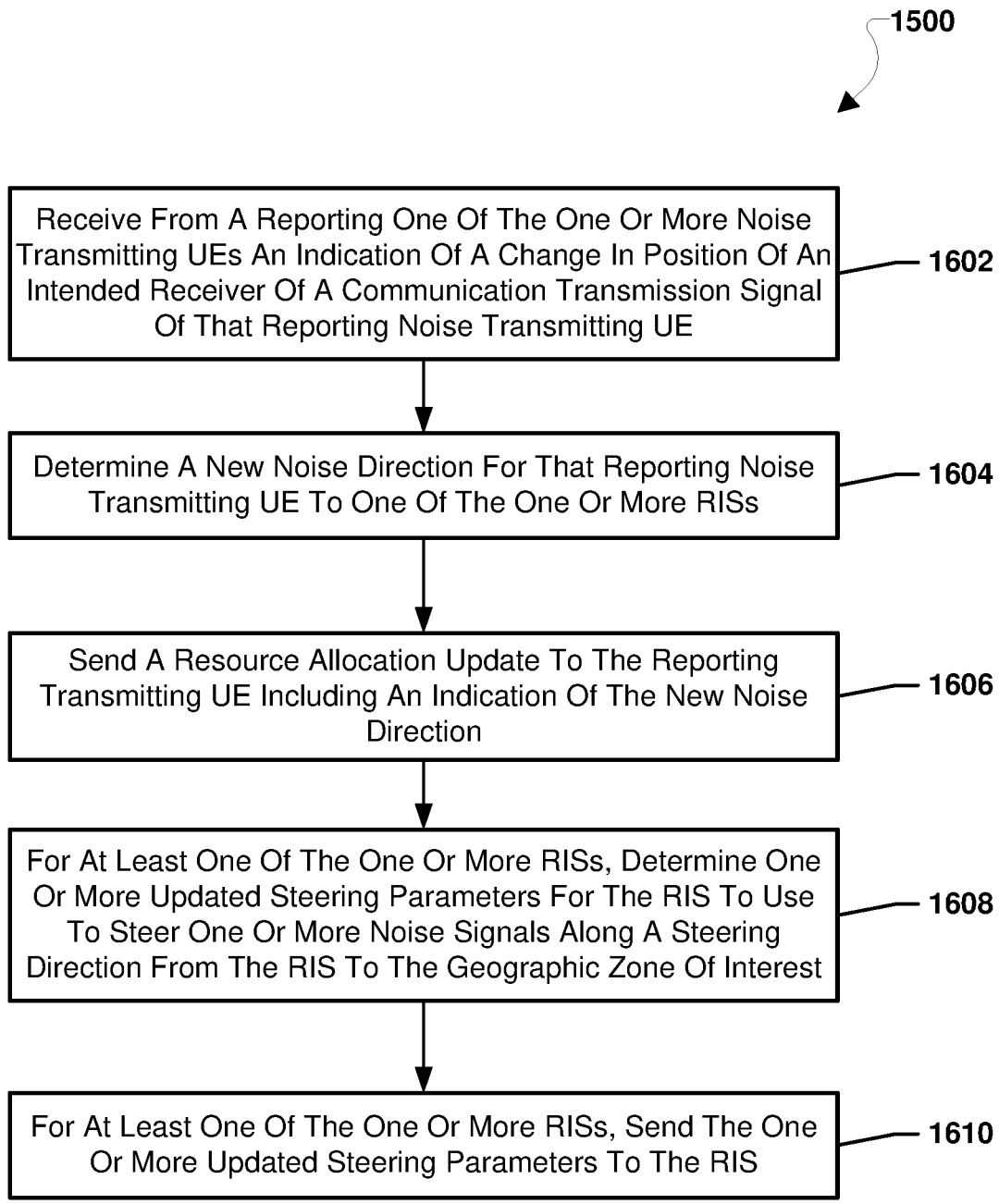
FIG. 16 is a process flow diagram illustrating a method for supporting directional security in a wireless network according to various embodiments.

FIG. 16 is a process flow diagram illustrating a method 1600 for supporting directional security in a wireless network that may be performed by a processor of a network device according to various embodiments. With reference to FIGS. 1-16, the operations of the method 1600 may be performed by a processor (such as the processor 210, 212, 214, 216, 218, 252, 260) of a network device (e.g., 110a, 110d, 350, 550 120a-120e, 320, 402). In various embodiments, the operations of the method 1600 may be performed in conjunction with the operations of the method 600 (FIG. 6), method 700 (FIG. 7), method 800 (FIG. 8), method 900 (FIG. 9), method 1000 (FIG. 10), method 1100 (FIG. 11), method 1200 (FIG. 12), method 1300 (FIG. 13), method 1400 (FIG. 14), and/or method 1500 (FIG. 15).

In block 1602, the processor may perform operations including receiving from a reporting one of the one or more noise transmitting UEs an indication of a change in position of an intended receiver of a communication transmission signal of that noise transmitting UE. The change in position of the intended receiver may trigger a report to the network device, such as a base station or other network node. The report may include a new or updated location of the intended receiver. Means for performing the operations of block 1602 may include the processor 210, 212, 214, 216, 218, 252, 260 and/or the transceiver 256, 266.

In block 1604, the processor may perform operations including determining a new noise direction from that reporting noise transmitting UE to one of the one or more RISs. Based on the new or updated location of the intended receiver, the network device may update a noise direction, a noise power level, and/or a noise parameter for the UE selected to participate in cooperative directional security. Means for performing the operations of block 1604 may include the processor 210, 212, 214, 216, 218, 252, 260.

In block 1606, the processor may perform operations including sending a resource allocation update to the reporting noise transmitting UE including an indication of the new noise direction. In some embodiments, the resource allocation may be sent as part of DCI messages to the UE. Means for performing the operations of block 1606 may include the processor 210, 212, 214, 216, 218, 252, 260 and/or the transceiver 256, 266.

In block 1608, the processor may perform operations including, for at least one of the one of the one or more RISs, determining one or more updated steering parameters for the RIS to use to steer one or more noise signals along a steering direction from the RIS to the geographic zone of interest. The network device may update the beamforming weights for the RIS to steer the beam toward the geographic zone of interest. Means for performing the operations of block 1608 may include the processor 210, 212, 214, 216, 218, 252, 260.

In block 1610, the processor may perform operations including, for at least one of the one of the one or more RISs, sending the one or more updated steering parameters to the RIS. For example, the one or more updated steering parameters may be sent via a connection (e.g., 156, 559) between the network device (e.g., a base station or other network node) and the RIS. Means for performing the operations of block 1610 may include the processor 210, 212, 214, 216, 218, 252, 260 and/or the transceiver 256, 266.

Figure 17A:
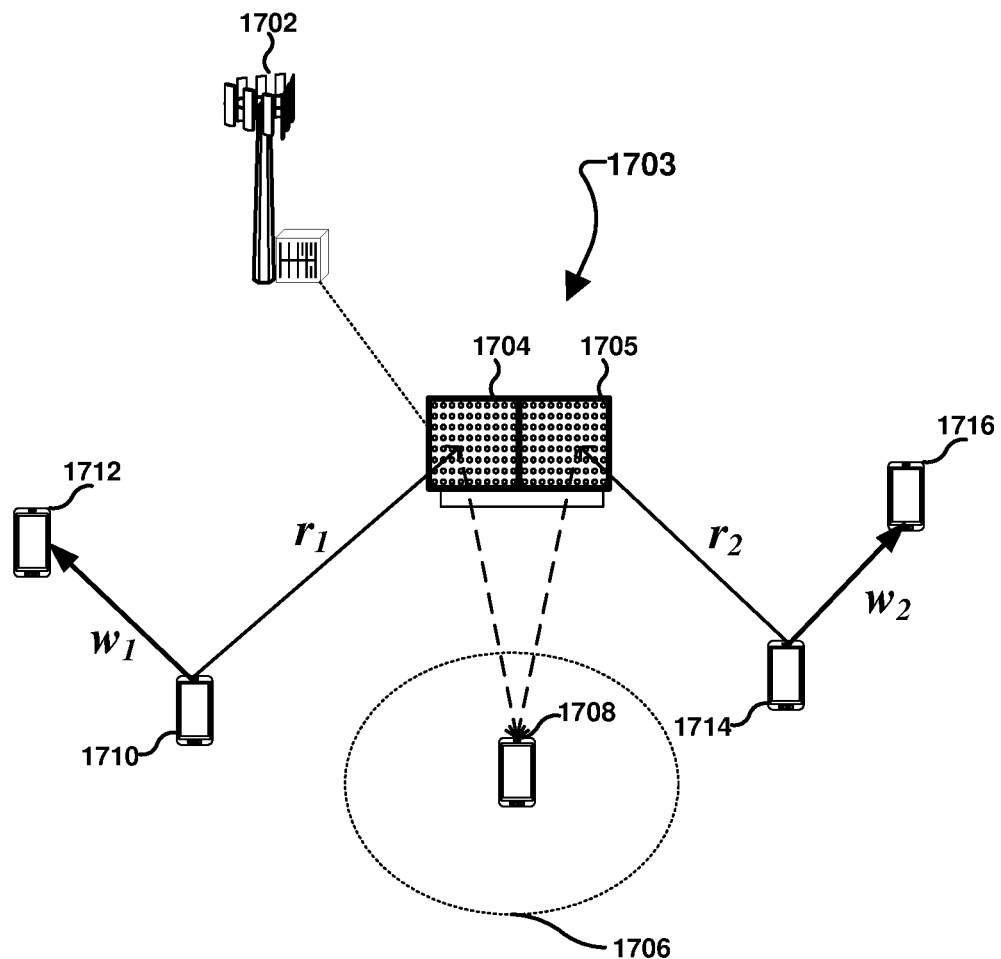
FIG. 17A is a system block diagram illustrating example operations for supporting directional security in a wireless network according to various embodiments.

FIG. 17A is a system block diagram illustrating example operations for supporting directional security in a wireless network according to various embodiments. With reference to FIGS. 1-17A, FIG. 17A illustrates example interactions according to operations of various embodiment methods, such as method 600 (FIG. 6), method 700 (FIG. 7), method 800 (FIG. 8), method 900 (FIG. 9), method 1000 (FIG. 10), method 1100 (FIG. 11), method 1200 (FIG. 12), method 1300 (FIG. 13), method 1400 (FIG. 14), method 1500 (FIG. 15), and/or method 1600 (FIG. 16).

As illustrated in FIG. 17A, a network device 1702 (e.g., network device 110a-110d, 350, 550) may be connected to a RIS 1703 (e.g., RIS 150, 400, 555). The network device 1702 may select the UEs 1710 (e.g., UE 120a-120e, 320, 552, 553, 555) and 1714 (e.g., UE 120a-120e, 320, 552, 553, 555) to provide cooperative directional security for geographic zone of interest 1706. The geographic zone of interest may be a region around a UE 1708 (e.g., UE 120a-120e, 320, 552, 553, 555), such as a malicious UE eavesdropping in the network (e.g., UE 1708). UE 1710 may be communicating with UE 1712 (e.g., UE 120a-120e, 320, 552, 553, 555). UE 1714 may be communicating with UE 1716 (e.g., UE 120a-120e, 320, 552, 553, 555).

The network device 1702 may control the RIS 1703 such that a first portion 1704 (or panel) of the reflecting surface of the RIS 1703, such as a selected number of the phase-shifting circuit elements (e.g., 474), are configured to steer a reflected noise signal from the UE 1710 into the geographic zone of interest 1706. The network device 1702 may control the RIS 1703 such that a second portion 1705 (or panel) of the reflecting surface of the RIS 1703, such as a selected number of the phase-shifting circuit elements (e.g., 474), are configured to steer a reflected noise signal from the UE 1714 into the geographic zone of interest 1706.

When the UE 1710 transmits its communication signal w1 in a direction toward the UE 1712, the UE 1710 may also transmit a noise signal r1 in a noise direction toward the RIS 1703. When the UE 1714 transmits its communication signal w2 in a direction toward the UE 1716, the UE 1714 may also transmit a noise signal r2 in a noise direction toward the RIS 1703. The noise signals r1 and r2 may be steered by the respective portions 1704, 1705 into the geographic zone of interest 1706. The steered noise signals may collectively cause interference in the geographic zone of interest 1706 thereby degrading the channel conditions experienced by the UE 1708.

Figure 17B:
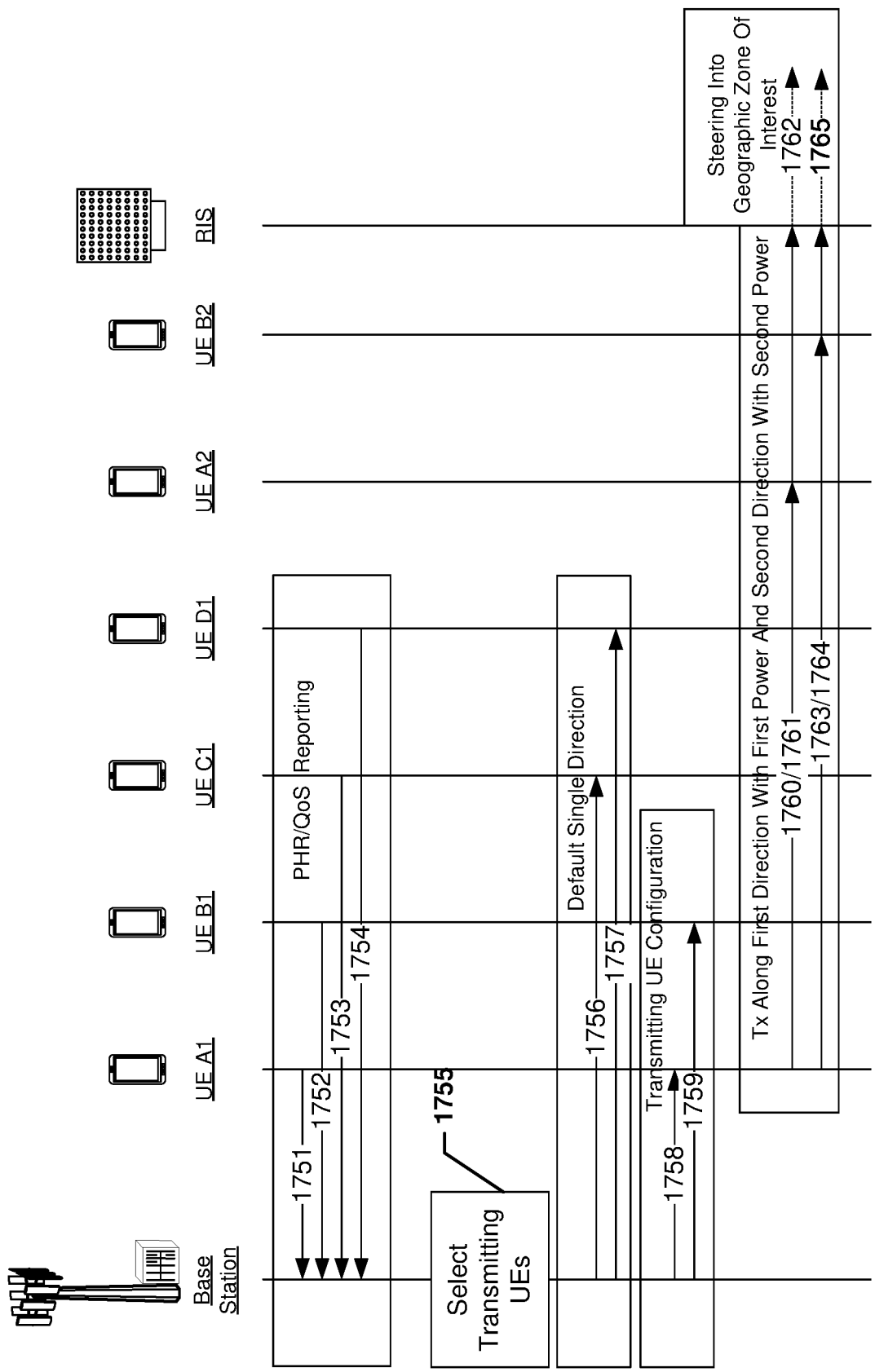
FIG. 17B is a call flow diagram illustrating example operations for supporting directional security in a wireless network according to various embodiments.

FIG. 17B is a call flow diagram illustrating example operations for supporting directional security in a wireless network according to various embodiments. With reference to FIGS. 1-17B, FIG. 17B illustrates example interactions according to operations of various embodiment methods, such as method 600 (FIG. 6), method 700 (FIG. 7), method 800 (FIG. 8), method 900 (FIG. 9), method 1000 (FIG. 10), method 1100 (FIG. 11), method 1200 (FIG. 12), method 1300 (FIG. 13), method 1400 (FIG. 14), method 1500 (FIG. 15), and/or method 1600 (FIG. 16).

As illustrated in FIG. 17B, in communications 1751, 1752, 1753, and 1754 respective UEs (e.g., UE 120a-120e, 320, 552, 553, 555, 1710, 1712, 1714, 1716), specifically UE A1, UE B1, UE C1, and UE D1, may provide PHR and/or QoS reports to the network device (e.g., 110a-110d, 350, 550, 1702). In operation 1755, the network device may select one or more transmitting UEs based on the PHR and/or QoS reporting. For example, the network device may select UEs reporting PHR and/or QoS metrics indicating the UEs may send a noise signal in addition to a communication signal without negatively impacting PHR and/or QoS thresholds. The network device may select UE A1 and UE B1 for cooperative direction security and may not selected UE C1 and UE D1. UE C1 and UE D1 may be granted resources by the network device for transmissions in only a single direction, respectively, in operations 1756 and 1757.

The network device may provide resource allocations to UE A1 and UE B1, respectively, in operations 1758 and 1759. The resource allocations to UE A1 and UE B1 may include indications of a communication signal direction and a communication signal power level for transmitting a communication signal and may include a noise signal direction and a noise signal power level for transmitting a noise signal.

In operations 1760 and 1761, the UE A1 may transmit along the communication signal direction at the communication signal power a communication signal to UE A2 (e.g., UE 120a-120e, 320, 552, 553, 555, 1710, 1712, 1714, 1716) and while transmitting the communication signal transmit a noise signal at the noise signal power in the noise signal direction to the RIS (e.g., RIS 150, 400, 555, 1703). In operations 1763 and 1764, the UE B1 may transmit along the communication signal direction at the communication signal power a communication signal to UE B2 (e.g., UE 120a-120e, 320, 552, 553, 555, 1710, 1712, 1714, 1716) and while transmitting the communication signal transmit a noise signal at the noise signal power in the noise signal direction to the RIS.

In operations 1762 and 1765, the RIS may steer the noise signals sent from the UE A1 and UE B1 into a geographic zone of interest.

Figure 18:
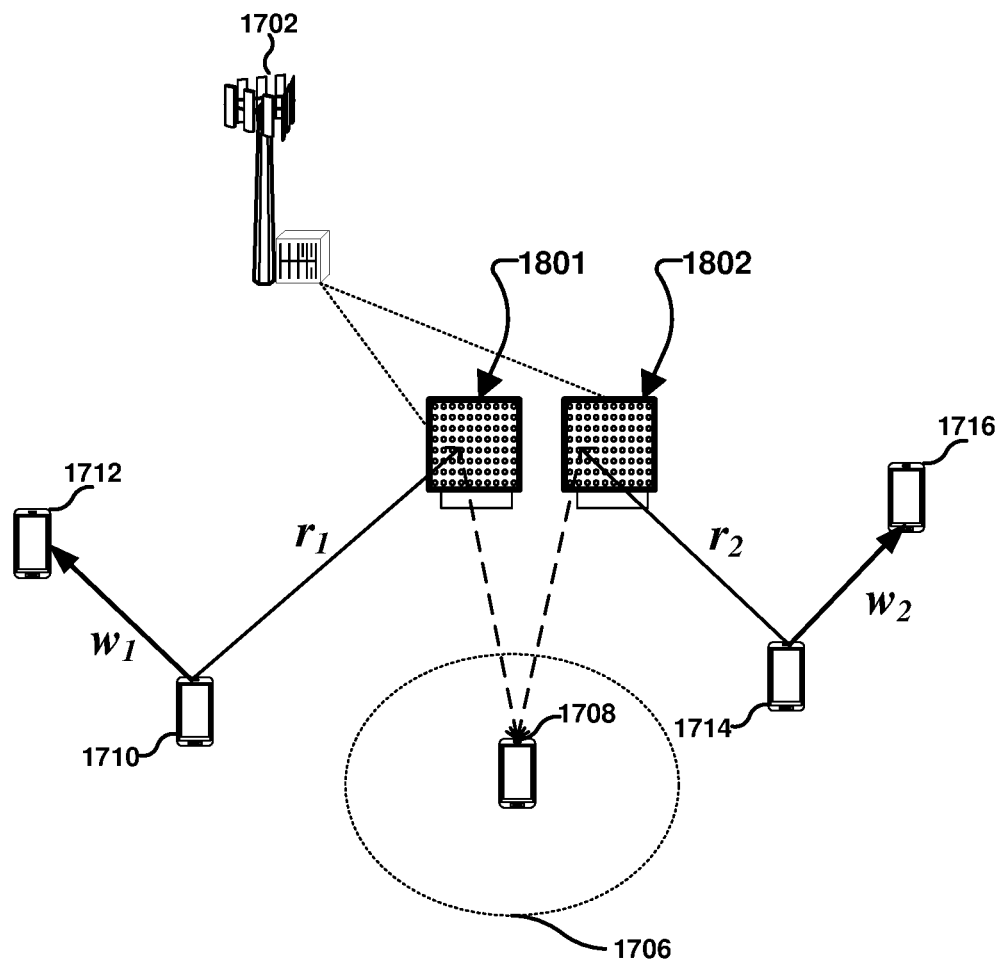
FIG. 18 is a system block diagram illustrating example operations for supporting directional security in a wireless network according to various embodiments.

FIG. 18 is a system block diagram illustrating example operations for supporting directional security in a wireless network according to various embodiments. With reference to FIGS. 1-18, FIG. 18 illustrates example interactions according to operations of various embodiment methods, such as method 600 (FIG. 6), method 700 (FIG. 7), method 800 (FIG. 8), method 900 (FIG. 9), method 1000 (FIG. 10), method 1100 (FIG. 11), method 1200 (FIG. 12), method 1300 (FIG. 13), method 1400 (FIG. 14), method 1500 (FIG. 15), and/or method 1600 (FIG. 16). FIG. 18 is similar to FIG. 17A, except that rather than a single RIS 1703 having two portions 1704 and 1705, the system of FIG. 18 may include two RISs 1801, 1802 (e.g., RIS 150, 500, 555, 1703) both connected to the network device 1702 and independently controlled.

As illustrated in FIG. 18, the network device 1702 may control the RIS 1801 such that the RIS 1801 is configured to steer a reflected noise signal from the UE 1710 into the geographic zone of interest 1706. The network device 1702 may control the RIS 1802 such that the RIS 1802 is configured to steer a reflected noise signal from the UE 1714 into the geographic zone of interest 1706. When the UE 1710 transmits its communication signal w1 in a direction toward the UE 1712, the UE 1710 may also transmit a noise signal r1 in a noise direction toward the RIS 1801. When the UE 1714 transmits its communication signal w2 in a direction toward the UE 1716, the UE 1714 may also transmit a noise signal r2 in a noise direction toward the RIS 1802. The noise signals r1 and r2 may be steered by the respective RISs 1801 and 1802 into the geographic zone of interest 1706. The steered noise signals may collectively cause interference in the geographic zone of interest 1706 thereby degrading the channel conditions experienced by the UE 1708.

Figure 19:
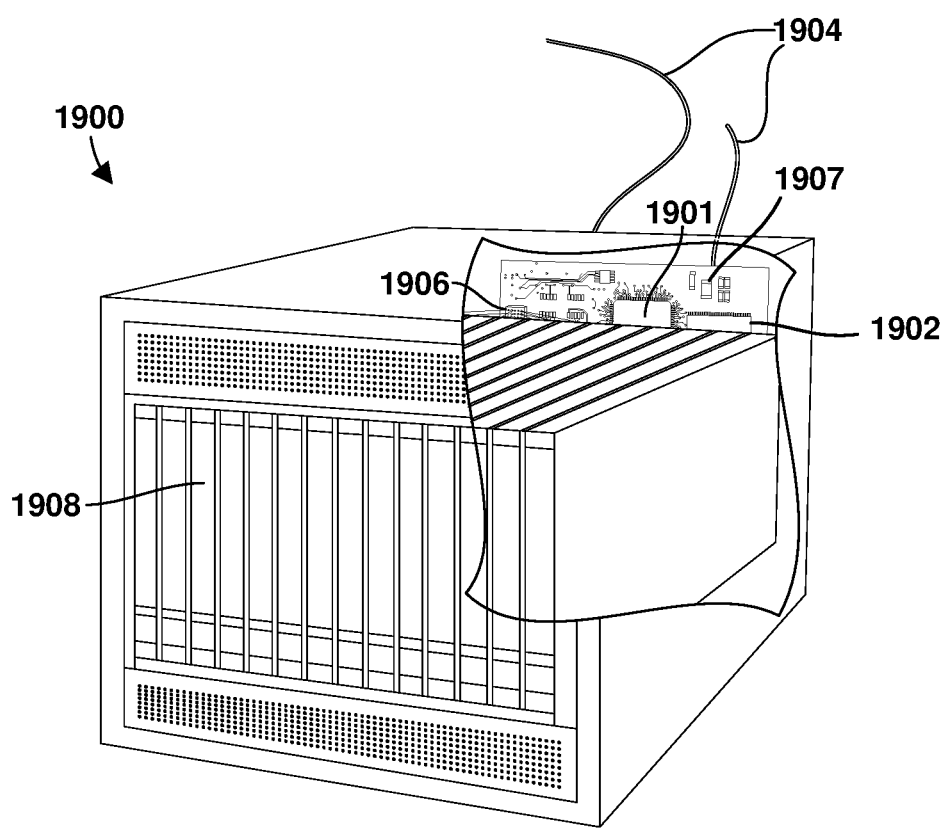
FIG. 19 is a component block diagram of a network device suitable for use with various embodiments.

FIG. 19 is a component block diagram of a network device 1900 suitable for use with various embodiments. Such network devices (e.g., 110a-110d, 350, 550, 1702) may include at least the components illustrated in FIG. 19. With reference to FIGS. 1-19, the network device 1900 may typically include a processor 1901 coupled to volatile memory 1902 and a large capacity nonvolatile memory, such as a disk drive 1908. The network device 1900 also may include a peripheral memory access device 1906 such as a floppy disc drive, compact disc (CD) or digital video disc (DVD) drive coupled to the processor 1901. The network device 1900 also may include network access ports 1904 (or interfaces) coupled to the processor 1901 for establishing data connections with a network, such as the Internet or a local area network coupled to other system computers and servers. The network device 1900 may include or be coupled to one or more antennas 1907 for sending and receiving electromagnetic radiation that may be connected to a wireless communication link. The network device 1900 may include additional access ports, such as USB, Firewire, Thunderbolt, and the like for coupling to peripherals, external memory, or other devices.

Figure 20:
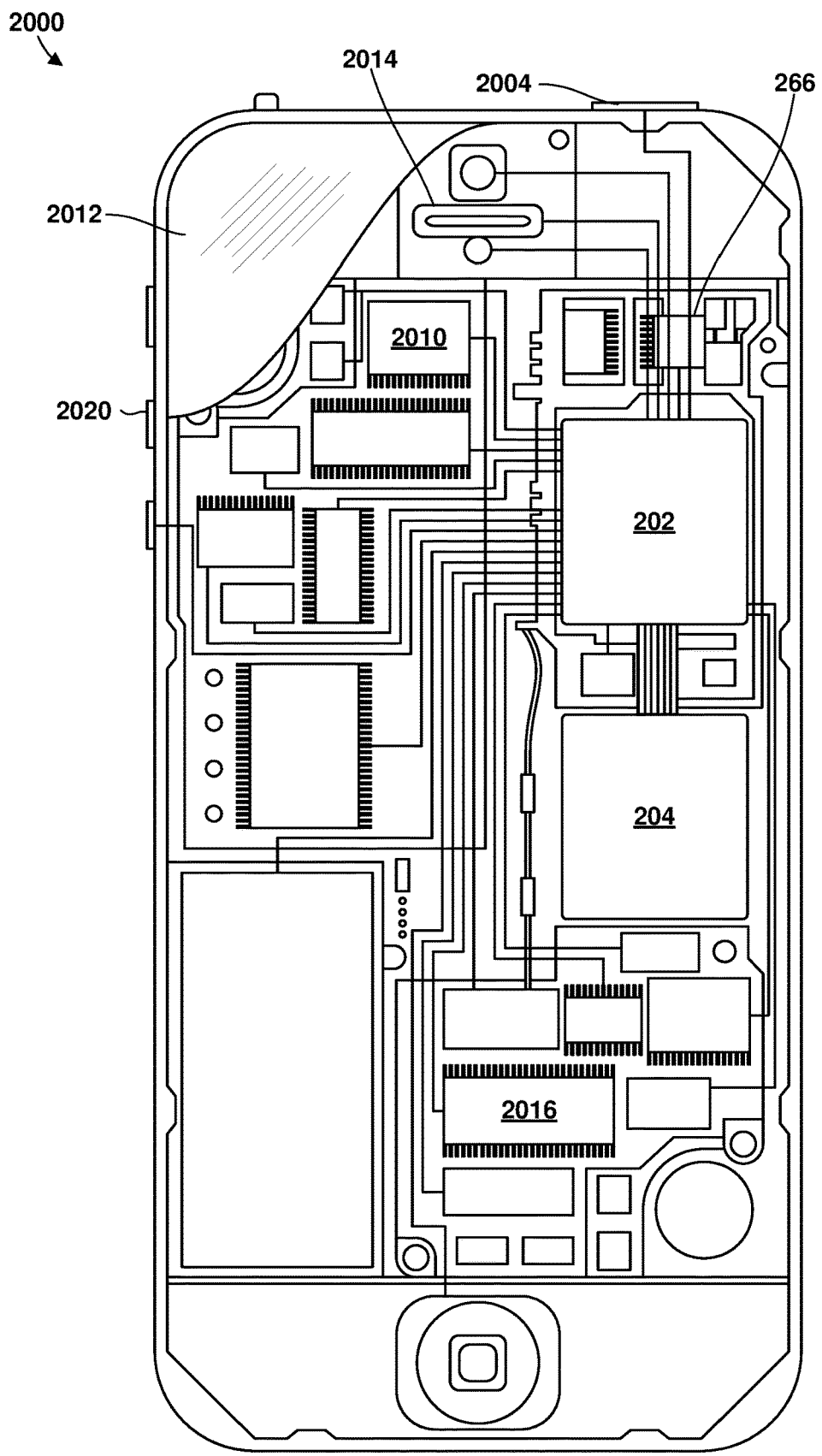
FIG. 20 is a component block diagram of a UE suitable for use with various embodiments.

FIG. 20 is a component block diagram of a UE 2000 suitable for use with various embodiments. With reference to FIGS. 1-20, various embodiments may be implemented on a variety of UEs 2000 (for example, the UEs 120*a*-120*e*, 320, 552, 553, 555, 1710, 1712, 1714, 1716, UE A1 UE A2, UE B1, UE B2, UE C1, UE D1), an example of which is illustrated in FIG. 20 in the form of a smartphone. The UE 2000 may include a first SOC 202 (for example, a SOC-CPU) coupled to a second SOC 204 (for example, a 5G capable SOC). The first and second SOCs 202, 204 may be coupled to internal memory 2016, a display 2012, and to a speaker 2014. Additionally, the UE 2000 may include an antenna 2004 for sending and receiving electromagnetic radiation that may be connected to a wireless transceiver 266 coupled to one or more processors in the first and/or second SOCs 202, 204. The UE 2000 may include menu selection buttons or rocker switches 2020 for receiving user inputs.

The UE 2000 may include a sound encoding/decoding (CODEC) circuit 2010, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 2010 may include a digital signal processor (DSP) circuit (not shown separately).

The processors of the network device 1900 and the UE 2000 may be any programmable microprocessor, microcomputer or multiple processor chip or chips that can be configured by software instructions (applications) to perform a variety of functions, including the functions of some implementations described below. In some UEs, multiple processors may be provided, such as one processor within an SOC 204 dedicated to wireless communication functions and one processor within an SOC 202 dedicated to running other applications. Software applications may be stored in the memory 1902, 2016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a UE and the UE may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations described herein may be substituted for or combined with one or more operations of the methods and operations.

Implementation examples are described in the following paragraphs. While some of the following implementation examples are described in terms of example methods, further example implementations may include: the example methods discussed in the following paragraphs implemented by a UE or a network device including a processor configured with processor-executable instructions to perform operations of the methods of the following implementation examples; the example methods discussed in the following paragraphs implemented by a UE or a network device including means for performing functions of the methods of the following implementation examples; and the example methods discussed in the following paragraphs may be implemented as a non-transitory processor-readable storage medium having stored thereon processor-executable instructions configured to cause a processor of a UE or a network device to perform the operations of the methods of the following implementation examples.

Example 1. A method for supporting directional security in a wireless network performed by a processor of a user equipment (UE), including receiving from a network device a noise resource allocation including an indication of a noise direction and a noise parameter, generating a noise signal based at least in part on the noise parameter, and transmitting the noise signal in the noise direction while transmitting a communication transmission signal in a different direction from the noise direction.

Example 2. The method of example 1, further including receiving from the network device a communication resource allocation for the communication transmission signal including an indication of the different direction.

Example 3. The method of either of examples 1 or 2, in which the communication resource allocation includes an indication of a first power level for the communication transmission signal, the noise resource allocation includes an indication of a second power level, and transmitting the noise signal in the noise direction while transmitting the communication transmission signal in the different direction from the noise direction includes transmitting the noise signal in the noise direction at the second power level while transmitting the communication transmission signal at the first power level in the different direction from the noise direction.

Example 4. The method of example 3, in which the second power level is less than a value of a power headroom below a maximum transmission power of the UE.

Example 5. The method of any of examples 1-4, further including, prior to receiving the noise resource allocation, determining whether cooperative directional security is supported, and sending a message including an indication of support for cooperative directional security to the network device in response to determining that cooperative directional security is supported.

Example 6. The method of example 5, further including sending, to the network device, an indication of an index of a codebook used for transmitting the communication transmission signal in response to determining that cooperative directional security is supported.

Example 7. The method of any of examples 1-6, further including sending an indication to the network device of a change in position of an intended receiver of the communication transmission signal, receiving from the network device a resource allocation update including an indication of a new direction for the communication transmission signal and a new direction for the noise signal, in which the new direction for the communication transmission signal is different than the new direction for the noise signal and is the same or different than the noise direction, and transmitting the noise signal in the new direction for the noise signal while transmitting the communication transmission signal in the new direction for the communication transmission signal.

Example 8. A method for supporting directional security in a wireless network performed by a processor of a network device, including determining a geographic zone of interest, selecting one or more reconfigurable intelligent surfaces (RISs) associated with the geographic zone of interest, selecting one or more noise transmitting User Equipments (UEs), controlling the one or more noise transmitting UEs to transmit at least one noise signal, and controlling the one or more RISs to steer the at least one noise signal into the geographic zone of interest.

Example 9. The method of example 8, in which controlling the one or more noise transmitting UEs to transmit at least one noise signal may include, for each noise transmitting UE, determining a noise direction from the noise transmitting UE to a RIS among the one or more RISs, determining a noise parameter for the noise transmitting UE, and sending a noise resource allocation including an indication of the noise direction and the noise parameter to the noise transmitting UE, and controlling the one or more RISs to steer the at least one noise signal into the geographic zone of interest includes, for each respective one of the one or more RISs, determining one or more steering parameters for the RIS to use to steer one or more noise signals along a steering direction from the RIS to the geographic zone of interest, and sending the one or more steering parameters to the RIS.

Example 10. The method of example 9, further including, for each respective one of the one or more noise transmitting UEs, sending a communication resource allocation for a communication transmission signal including an indication of a different direction from the noise direction.

Example 11. The method of any of examples 9-10, further including, for each respective one of the one or more noise transmitting UEs, determining a noise power level that is less than a power level of a communication transmission signal, in which the noise resource allocation further includes an indication of the noise power level.

Example 12. The method of any of examples 9-11, in which the one or more steering parameters includes beamforming weights.

Example 13. The method of any of examples 9-12, in which the noise parameter includes an indication of a modulation coding scheme or a pseudorandom key.

Example 14. The method of any of examples 9-13, further including receiving from a reporting one of the one or more noise transmitting UEs an indication of a change in position of an intended receiver of a communication transmission signal of that reporting noise transmitting UE, determining a new noise direction from that reporting noise transmitting UE to a RIS among the one or more RISs, sending a resource allocation update to the reporting noise transmitting UE including an indication of the new noise direction, and for at least one of the one of the one or more RISs determining one or more updated steering parameters for the RIS to use to steer one or more noise signals along a steering direction from the RIS to the geographic zone of interest, and sending the one or more updated steering parameters to the RIS.

Example 15. The method of any of examples 8-14, in which selecting one or more noise transmitting UEs includes selecting available UEs reporting support for cooperative directional security as cooperative UEs, determining positions of each of the cooperative UEs, selecting any of the cooperative UEs that are in a position relative to at least one of the one or more RISs to transmit a noise signal toward at least one of the one or more RISs as positioned cooperative UEs, determining at least one transmission metric for each of the positioned cooperative UEs, and selecting any of the positioned cooperative UEs having the at least one transmission metric meeting a noise transmission requirement as the one or more noise transmitting UEs.

Example 16. The method of example 15, in which the at least one transmission metric is a power headroom and the noise transmission requirement is a minimum power headroom.

Example 17. The method of any of examples 1-15, in which the noise transmitting UE is a wireless communication device.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting directional security in a wireless network performed by a processor of a user equipment (UE), comprising:
   receiving from a network device a noise resource allocation including an indication of a noise direction and a noise parameter, wherein the noise resource allocation includes an indication of a second power level;
   receiving from the network device a communication resource allocation for a communication transmission signal including an indication of a different direction from the noise direction, wherein the communication resource allocation includes an indication of a first power level for the communication transmission signal;
   generating a noise signal based at least in part on the noise parameter; and
   transmitting the noise signal in the noise direction at the second power level while transmitting the communication transmission signal at the first power level in the different direction from the noise direction.

2. The method of claim 1, wherein the second power level is less than a value of a power headroom below a maximum transmission power of the UE.

3. The method of claim 1, further comprising, prior to receiving the noise resource allocation:
   determining whether cooperative directional security is supported; and
   sending a message including an indication of support for cooperative directional security to the network device in response to determining that cooperative directional security is supported.

4. The method of claim 3, further comprising sending, to the network device, an indication of an index of a codebook used for transmitting the communication transmission signal in response to determining that cooperative directional security is supported.

5. The method of claim 1, further comprising:
   sending an indication to the network device of a change in position of an intended receiver of the communication transmission signal;
   receiving from the network device a resource allocation update including an indication of a new direction for the communication transmission signal and a new direction for the noise signal, wherein the new direction for the communication transmission signal is different than the new direction for the noise signal and is the same or different than the noise direction; and
   transmitting the noise signal in the new direction for the noise signal while transmitting the communication transmission signal in the new direction for the communication transmission signal.

6. A method for supporting directional security in a wireless network performed by a processor of a network device, comprising:
  determining a geographic zone of interest;
  selecting one or more reconfigurable intelligent surfaces (RISs) associated with the geographic zone of interest;
  selecting one or more noise transmitting User Equipments (UEs), wherein selecting the one or more noise transmitting UEs comprises:
    selecting available UEs reporting support for cooperative directional security as cooperative UEs;
    determining positions of each of the cooperative UEs;
    selecting any of the cooperative UEs that are in a position relative to at least one of the one or more RISs to transmit a noise signal toward at least one of the one or more RISs as positioned cooperative UEs;
    determining at least one transmission metric for each of the positioned cooperative UEs; and
    selecting any of the positioned cooperative UEs having the at least one transmission metric meeting a noise transmission requirement as the one or more noise transmitting UEs;
  controlling the one or more noise transmitting UEs to transmit at least one noise signal; and
  controlling the one or more RISs to steer the at least one noise signal into the geographic zone of interest.

7. The method of claim 6, wherein:
  controlling the one or more noise transmitting UEs to transmit at least one noise signal comprises, for each noise transmitting UE:
    determining a noise direction from the noise transmitting UE to a RIS among the one or more RISs;
    determining a noise parameter for the noise transmitting UE; and
    sending a noise resource allocation including an indication of the noise direction and the noise parameter to the noise transmitting UE; and
  controlling the one or more RISs to steer the at least one noise signal into the geographic zone of interest comprises, for each respective one of the one or more RISs:
    determining one or more steering parameters for the RIS to use to steer one or more noise signals along a steering direction from the RIS to the geographic zone of interest; and
    sending the one or more steering parameters to the RIS.

8. The method of claim 7, further comprising, for each respective one of the one or more noise transmitting UEs:
  sending a communication resource allocation for a communication transmission signal including an indication of a different direction from the noise direction.

9. The method of claim 8, further comprising, for each respective one of the one or more noise transmitting UEs:
  determining a noise power level that is less than a power level of a communication transmission signal,
  wherein the noise resource allocation further includes an indication of the noise power level.

10. The method of claim 9, wherein the one or more steering parameters comprise beamforming weights.

11. The method of claim 9, wherein the noise parameter comprises an indication of a modulation coding scheme or a pseudorandom key.

12. The method of claim 9, further comprising:
  receiving from a reporting one of the one or more noise transmitting UEs an indication of a change in position of an intended receiver of a communication transmission signal of that reporting noise transmitting UE;
  determining a new noise direction from that reporting noise transmitting UE to a RIS among the one or more RISs;
  sending a resource allocation update to the reporting noise transmitting UE including an indication of the new noise direction; and
  for at least one of the one of the one or more RISs:
    determining one or more updated steering parameters for the RIS to use to steer one or more noise signals along a steering direction from the RIS to the geographic zone of interest; and
    sending the one or more updated steering parameters to the RIS.

13. The method of claim 6, wherein:
  the at least one transmission metric is a power headroom; and
  the noise transmission requirement is a minimum power headroom.

14. A user equipment (UE), comprising:
  a processor configured with processor executable instructions to:
    receive from a network device a noise resource allocation including an indication of a noise direction and a noise parameter, wherein the noise resource allocation includes an indication of a second power level;
    receive from the network device a communication resource allocation for a communication transmission signal including an indication of a different direction from the noise direction, wherein the communication resource allocation includes an indication of a first power level for the communication transmission signal;
    generate a noise signal based at least in part on the noise parameter; and
    transmit the noise signal in the noise direction at the second power level while transmitting the communication transmission signal at the first power level in the different direction from the noise direction.

15. The UE of claim 14, wherein the UE is a wireless communication device.

16. The UE of claim 14, wherein the processor is further configured with processor executable instructions to, prior to receiving the noise resource allocation:
  determine whether cooperative directional security is supported; and
  send a message including an indication of support for cooperative directional security to the base station in response to determining that cooperative directional security is supported.

17. The UE of claim 16, wherein the processor is further configured with processor executable instructions to send to the base station an indication of an index of a codebook used for transmitting the communication transmission signal in response to determining that cooperative directional security is supported.

18. The UE of claim 14, wherein the processor is further configured with processor executable instructions to:
  send an indication to the network device of a change in position of an intended receiver of the communication transmission signal;
  receive from the network device a resource allocation update including an indication of a new direction for the communication transmission signal and a new direction for the noise signal, wherein the new direction for the communication transmission signal is different than the new direction for the noise signal and is the same or different than the noise direction; and transmit the noise signal in the new direction for the noise signal while transmitting the communication transmission signal in the new direction for the communication transmission signal.

19. A network device, comprising:
a processor configured with processor executable instructions to:
   determine a geographic zone of interest;
   select one or more reconfigurable intelligent surfaces (RISs) associated with the geographic zone of interest;
   select one or more noise transmitting User Equipments (UEs), wherein to select the one or more noise transmitting UEs the processor is further configured with processor executable instructions to:
      select available UEs reporting support for cooperative directional security as cooperative UEs;
      determine positions of each of the cooperative UEs;
      select any of the cooperative UEs that are in a position relative to at least one of the one or more RISs to transmit a noise signal toward at least one of the one or more RISs as positioned cooperative UEs;
      determine at least one transmission metric for each of the positioned cooperative UEs; and
      select any of the positioned cooperative UEs having the at least one transmission metric meeting a noise transmission requirement as the one or more noise transmitting UEs;
   control the one or more noise transmitting UEs to transmit at least one noise signal; and
   control the one or more RISs to steer the at least one noise signal into the geographic zone of interest.

20. The network device of claim 19, wherein:
to control the one or more noise transmitting UEs to transmit at least one noise signal for each noise transmitting UE, the processor is further configured with processor executable instructions to:
   determine a noise direction from the noise transmitting UE to a RIS among the one or more RISs;
   determine a noise parameter for the noise transmitting UE; and
   send a noise resource allocation including an indication of the noise direction and the noise parameter to the noise transmitting UE; and
to control the one or more RISs to steer the at least one noise signal into the geographic zone of interest for each respective one of the one or more RISs, the processor is further configured with processor executable instructions to:
   determine one or more steering parameters for the RIS to use to steer one or more noise signals along a steering direction from the RIS to the geographic zone of interest; and
   send the one or more steering parameters to the RIS.

21. The network device of claim 20, wherein the processor is further configured with processor executable instructions to, for each respective one of the one or more noise transmitting UEs:
   send a communication resource allocation for a communication transmission signal including an indication of a different direction from the noise direction.

22. The network device of claim 21, wherein the processor is further configured with processor executable instructions to, for each respective one of the one or more noise transmitting UEs:
   determine a noise power level that is less than a power level of a communication transmission signal, wherein the noise resource allocation further includes an indication of the noise power level.

23. The network device of claim 21, wherein the processor is further configured with processor executable instructions to:
   receive from a reporting one of the one or more noise transmitting UEs an indication of a change in position of an intended receiver of a communication transmission signal of that reporting noise transmitting UE;
   determine a new noise direction from that reporting noise transmitting UE to a RIS among the one or more RISs;
   send a resource allocation update to the reporting noise transmitting UE including an indication of the new noise direction; and
   for at least one of the one of the one or more RISs:
      determine one or more updated steering parameters for the RIS to use to steer one or more noise signals along a steering direction from the RIS to the geographic zone of interest; and
      send the one or more updated steering parameters to the RIS.

24. The network device of claim 19, wherein:
the at least one transmission metric is a power headroom; and
the noise transmission requirement is a minimum power headroom.

* * * * *